(12) United States Patent
Lin

(10) Patent No.: US 9,500,873 B2
(45) Date of Patent: Nov. 22, 2016

(54) MULTI-VIEW THREE-DIMENSIONAL IMAGE DISPLAY METHOD

(71) Applicant: UNIQUE INSTRUMENTS CO.LTD, Taipei (TW)

(72) Inventor: Ming-Yen Lin, Taipei (TW)

(73) Assignee: ZHANGJIAGANG KANGDE XIN OPTRONICS MATERIAL CO., LTD., Jiangsu Province (CN)

( * ) Notice: Subject to any disclaimer, the term of this patent is extended or adjusted under 35 U.S.C. 154(b) by 513 days.

(21) Appl. No.: 14/039,737

(22) Filed: Sep. 27, 2013

(65) Prior Publication Data

US 2014/0092223 A1    Apr. 3, 2014

(30) Foreign Application Priority Data

Sep. 28, 2012    (TW) ............... 101135830 A

(51) Int. Cl.
*G02B 27/22*    (2006.01)
(52) U.S. Cl.
CPC ................ *G02B 27/2214* (2013.01)
(58) Field of Classification Search
CPC ........ G02B 27/2214; H04N 13/0409
See application file for complete search history.

(56) References Cited

U.S. PATENT DOCUMENTS

| 6,064,424 A | 5/2000 | van Berkel et al. |
| 2007/0013720 A1* | 1/2007 | McRight ............... F16M 11/04 345/649 |
| 2011/0234929 A1* | 9/2011 | Lin .................... G02B 27/2214 349/15 |
| 2013/0114135 A1* | 5/2013 | Lin .................... H04N 13/0409 359/464 |

FOREIGN PATENT DOCUMENTS

| TW | 201122645 | 7/2011 |
| TW | 201209448 | 3/2012 |
| TW | 201216684 | 4/2012 |
| TW | 201320717 | 5/2013 |

* cited by examiner

*Primary Examiner* — Obafemi Sosanya
(74) *Attorney, Agent, or Firm* — WPAT, PC; Justin King; Jonathan Chiang

(57) ABSTRACT

The present invention relates to a method for displaying a three-dimensional (3D) image, which is further composed of a multi-view 3D image combination method and a parallax barrier structure design, and is being used in a case when a common flat-panel display screen and a view separation device are used to display a 3D image.

6 Claims, 36 Drawing Sheets n=2
m=6
Q=2
Δ=1
Π=1
FIG.6

$\Delta=1$ a=2, b=1, c=7, d=7, n=7, m=1, Q=1, Π=1

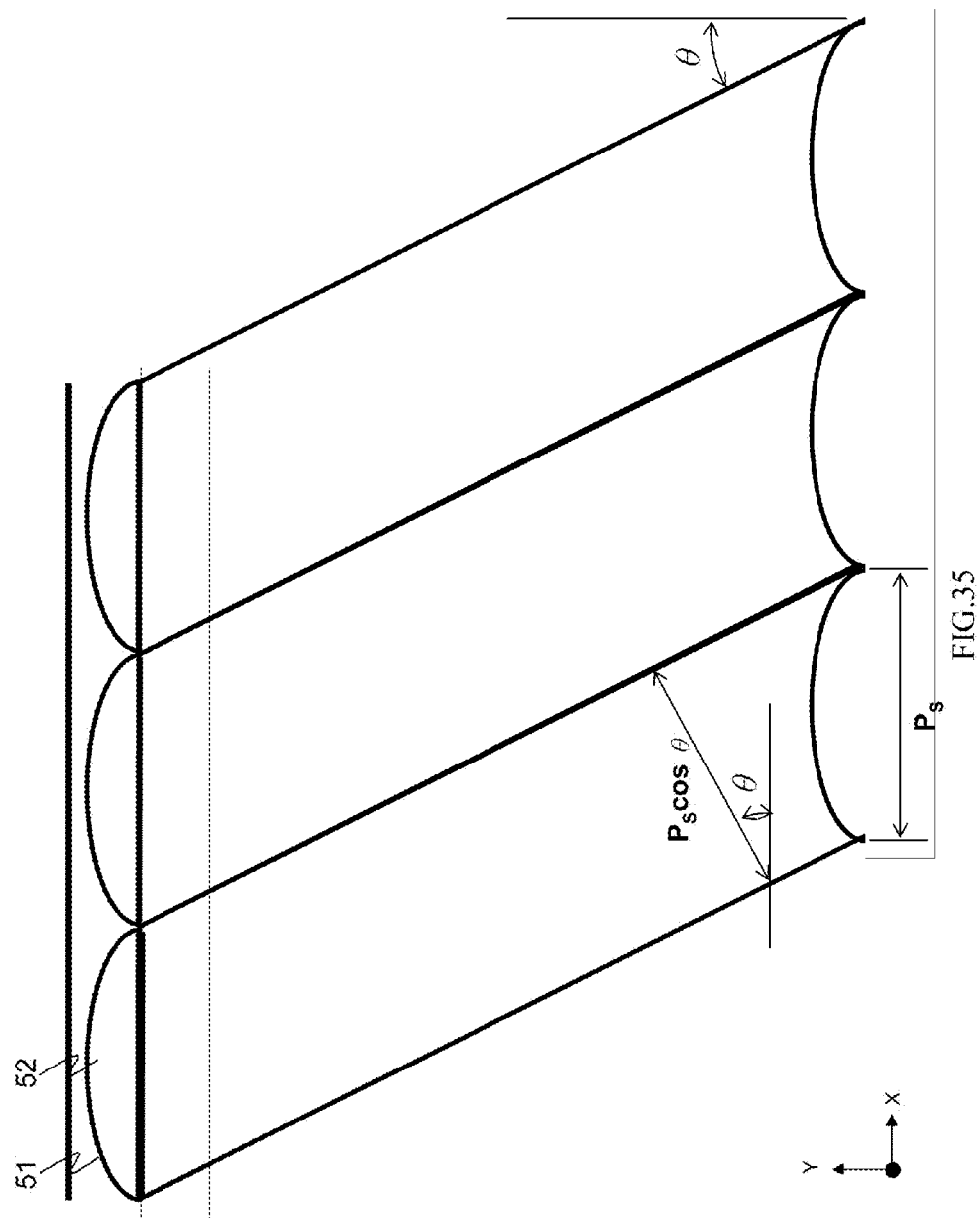

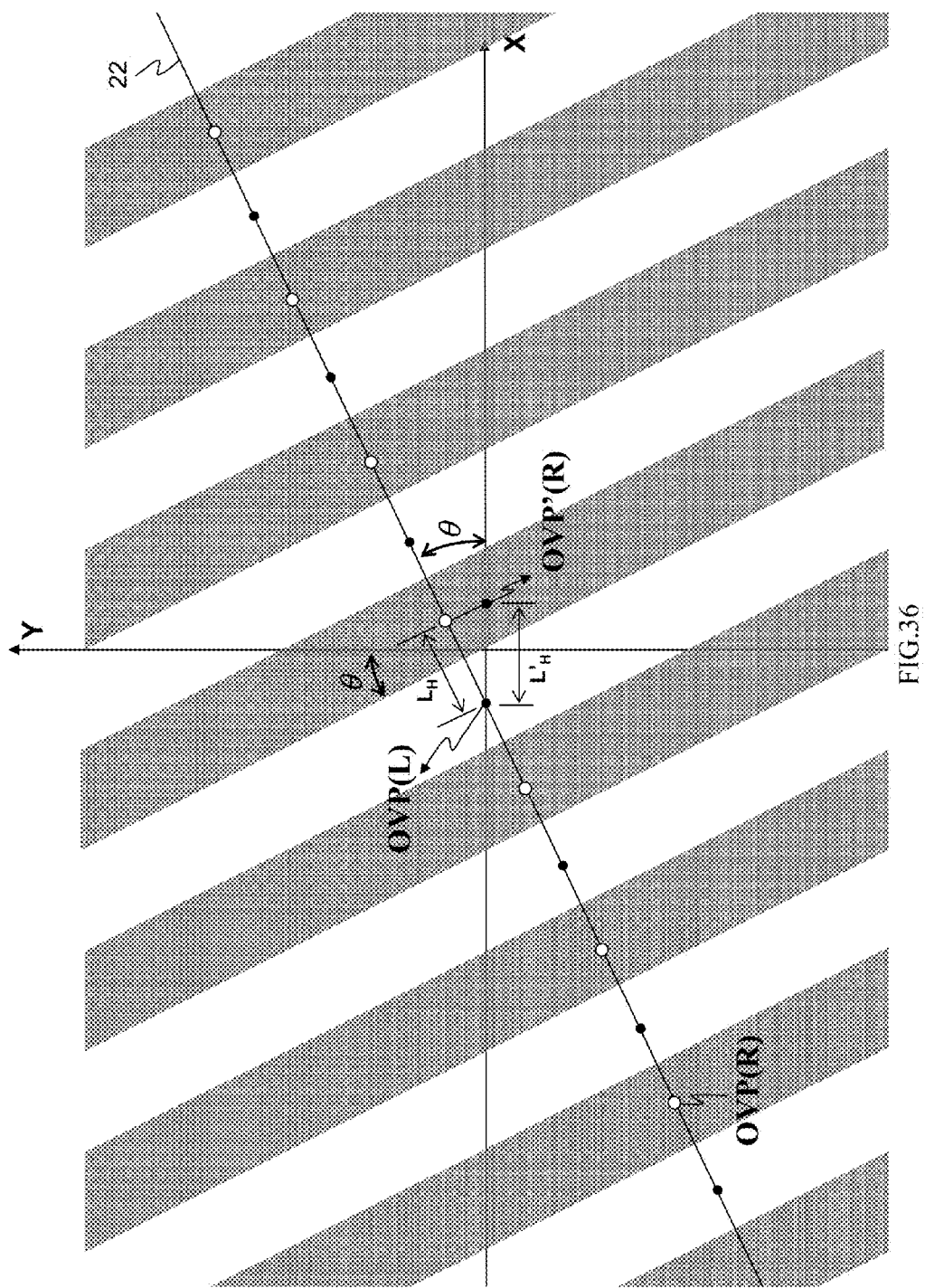

MULTI-VIEW THREE-DIMENSIONAL IMAGE DISPLAY METHOD

FIELD OF THE INVENTION

The present invention relates to a multi-view three-dimensional (3D) image display method, and more particularly to an improvement over the 3D image displaying method disclosed in TW Pat. Publication No 201320717.

BACKGROUND OF THE INVENTION

Please refer to FIG. 1 to FIG. 4, which are schematic diagrams showing different exemplary sub-pixel arrangements in common flat-panel displays, such as liquid crystal displays (LCD), plasma display or organic light emitting diode (OLED) displays. Wherein, FIG. 1 shows a display screen 1 having R, G, and B sub-pixels in vertical strip configuration; FIG. 2 shows a display screen 1 having R, G, and B sub-pixels in mosaic configuration; FIG. 3 shows a display screen 1 having R, G, and B sub-pixels in delta configuration; and FIG. 4 shows a display screen 1 having R, G, and B sub-pixels in pentile configuration. As shown in FIG. 1 to FIG. 4, the display screen 1 is composed of N×M sub-pixels, in which N represents the total number of sub-pixels in a horizontal direction (X axis) of the display screen, and M represents the total number of sub-pixels in a vertical direction (Y axis) of the display screen. In addition, the horizontal position and the vertical position of any single sub-pixel in N×M display screen are represented respectively using the index i and j, whereas $0 \leq j \leq N-1$ and $0 \leq i \leq M-1$; and each single sub-pixel has a size of $P_H \times P_V$, whereas $P_H$ represents the horizontal width of a single sub-pixel and $P_V$ represents the vertical height of a single sub-pixel. In the following description, a coordinate system of XYZ axes is used, and is defined according to the Right-hand rule with the three axes X, Y and Z to be at ring angle to each other in a manner that the X and Y axes define a horizontal direction and a vertical direction of a display while allowing the Z axis to be arranged perpendicular to the display screen. Moreover, it is common that the display screen is centered at the origin of the aforesaid coordinate system, and thus the aforesaid XYZ coordinate system can be referred as a screen coordinate system. Therefore, an image displayed on the aforesaid display screen can be represented as following:

$$V = \sum_{i=0}^{M-1}\sum_{j=0}^{N-1} V(i,j) \tag{1}$$

wherein, V(i,j) represents the sub-pixel image data at position (i,j) of the display screen.

Consequently, any multi-view image displayed on the screen can be represented as a composition of a plurality of single-view image $V_k$, whereas the single-view image can be defined as following:

$$V_k = \sum_{i=0}^{M-1}\sum_{j=0}^{N-1} V_k(i,j) \tag{2}$$

wherein, n is the total amount of view, k represents the index of view, and
$0 \leq k < n$, $n \geq 2$; and $V_k$ (i,j) represents the sub-pixel image data of a single-view image $V_k$ at position (i,j) of the display screen.

The following description relates to the shortcomings of a multi-view 3D image combination method that is disclosed in TW Pat. Publication No. 201320717. In the method disclosed in TW Pat. Publication No. 201320717, a multi-view combined 3D image is generated according to the following formula:

$$\Sigma_n = \sum_{i=0}^{M-1}\sum_{j=0}^{N-1} V_\Lambda(i,j) \tag{3}$$

wherein, for the multi-view combined 3D images having a feature of slanting to the right, the index $\Lambda$ is defined as:

$$\Lambda = \mathrm{Mod}\left[\mathrm{int}\left[\frac{j - \Pi \times \mathrm{int}\left(\frac{i+\Delta}{Q}\right)}{m}\right], n\right] \tag{4}$$

for the multi-view combined 3D images having a feature of slanting to the left, the index $\Lambda$ is defined as:

$$\Lambda = \mathrm{Mod}\left[\mathrm{int}\left[\frac{(N-1) - j - \Pi \times \mathrm{int}\left(\frac{i+\Delta}{Q}\right)}{m}\right], n\right] \tag{5}$$

Similarly, $V_\Lambda$ (i,j) represents the sub-pixel image data of a single-view image $V_\Lambda$ at position (i,j) of the display screen; $\Lambda$ represents a view number, and $\Lambda < n$, while n is the total amount of view; m is a number of sub-pixels of a smallest display unit in horizontal direction, while Q is a number of sub-pixels of a smallest display unit in vertical direction, and thereby, mQ represents the smallest display unit; $\Delta$ is a horizontal displacement phase; $\Pi$ is a horizontal displacement amplitude, the index i and j are respectively a horizontal position number and vertical position number of each sub-pixel, whereas $0 \leq j \leq N-1$ and $0 \leq i \leq M-1$; and int is a round down integer function, and Mod is a function of taking a remainder.

The following description of shortcomings is provided using only formula (4) for illustration. Taking the 2-view combined 3D image $\Sigma_n$ shown in FIG. 5 for example, for simplifying and displaying the 2-view combined 3D image $\Sigma_n$, whereas n=2, m=6, Q=2, $\Delta=0$, and $\Pi=1$, it is defined by letting $V_\Lambda(i,j)=\Lambda$, and thereby, when the number 0 is displayed at a position (i,j) of the display screen, it represents a left-view data and when the number 1 is displayed at a position (i,j) of the display screen, it represents a right-view data, or vice versa. That is, when the sub-pixel data at a position (i, j) of the display screen is replaced by the view numbers, i.e. $V_\Lambda(i, j)=\Lambda$, the origin of the image at the position (i, j) relating to whether it is obtained from a left-view image or a right image is clearly indicated, and thus also the overall structural characteristic of the combined 3D image can be clearly demonstrated. In addition, when the value of $\Delta$ is changed, e.g. $\Delta=1$, the amount of mQ sub-pixels in the smallest display unit can not be moved simultaneously to the right according to a horizontal displacement phase of $\Delta=1$. As shown in FIG. 6, $V_\Lambda(0,0)$ and $V_\Lambda(0,6)$ are not 0, 1 in respective, but should be 1, 0, so that the amount mQ sub-pixels in the smallest display unit can be moved simultaneously to the left according to a horizontal displacement phase of Δ=1. Moreover, the multi-view 3D image combination disclosed in U.S. Pat. No. 6,064,424 can not be achieved using the formula (4) and (5), as shown in FIG. 7.

The following description relates to the shortcomings for designing a parallax barrier device that is disclosed in TW Pat. Publication No. 201320717, and is based upon a 2-view slantwise strip parallax barrier.

Please refer to FIG. 8, which is a schematic diagram showing a slantwise strip parallax barrier for 2-view images. In FIG. 8, a 2-view slantwise strip parallax barrier 30 is used and it is composed of a plurality of slantwise strip transparent elements 31 and a plurality of slantwise strip shield elements 32, whereas one barrier unit 33 in the 2-view slantwise strip parallax barrier 30 is defined to be the composition of one transparent element 31 and one shield element 32, and there are a plurality of such barrier units being arranged one next to another in a horizontal direction so as to form the 2-view slantwise strip parallax barrier 30. Notably, each transparent element 31 is formed in a width $B_H$ and with a slant angle θ, and also each shield element 32 is formed in a width $\overline{B}_H$ and with a slant angle θ. Thus, the horizontal width of one barrier unit 33 will be $P_B = B_H \overline{B}_H$. It is noted that the parallax barrier 30 is used for displaying a 2-view 3D combined image $\Sigma_n$ (n=2, m=3, Q=1, Π=1 and Δ=0) on a display screen 1, whereas $V_A(i, j)=0$ indicates a left-view image L and $V_A(i, j)=1$ indicates a right-view image R.

Please refer to FIG. 9, which is a schematic diagram showing a view separation principle for parallax barriers. In FIG. 9, the slantwise strip parallax barrier 30 is disposed in front of a display screen 1 at a distance $L_B$ away, and in a screen coordinate system of the display screen 1, for the 2-view combined 3D image $\Sigma_n$, the slantwise strip parallax barrier 30 may perform the optical effect of view separation on the combined 3D image $\Sigma_n$ and provide multiple optimum viewing points (OVPs), such as OVP(L) and OVP(R), at an optimum viewing distance $Z_0$, and perform the optical effect of view separation at each optimum viewing point to achieve the objective of respectively presenting a single-view image. Therefore, by locating the left eye 2 and right eye 3 of a viewer at the positions OVP(L) and OVP(R) in respective, the viewer is able to experience and see a 3D image.

In fact, it is feasible to define an optimum viewing plane at the optimum viewing distance $Z_0$ that is arranged perpendicular to the Z axis of the screen coordinate system, as shown in FIG. 10, and the multiple optimum viewing points $P_{k,i,j}(x_c, y_c, Z_0)$ are located on the optimun viewing plane so that each of the optimum viewing points $P_{k,i,j}(x_c, y_c, Z_0)$ is enable to perform the optical effect of view separation for obtaining a corresponding single-view images. In FIG. 10, $L_H$ is the optimum horizontal interval between two neighboring optimum viewing points, and $L_V$ is the optimum vertical interval between two neighboring optimum viewing points, whereas, in general, $L_H$ is defined to be 63.5 mm which is the average interpupillary distance (IPD). Thus, on the horizontal direction, the aforesaid parameters in the slantwise strip parallax barrier can be defined by the following formulas:

$$B_H = \frac{D_H L_H}{D_H + L_H} \quad (6)$$

$$\overline{B}_H = (n-1)B_H \quad (7)$$

-continued $$L_H = \frac{D_H B_H}{D_H - B_H} \quad (8)$$

$$\tan\theta = \frac{P_H}{QP_V} = \frac{D_H}{mD_V} \quad (9)$$

$$Z_0 = \frac{D_H}{D_H - B_H} L_B \quad (10)$$

$$D_H = mP_H \quad (11)$$

$$D_V = QP_V \quad (12)$$

wherein, $P_H$ is a horizontal width of a sub-pixel;
$P_V$ is a vertical height of a sub-pixel;
m is a number of sub-pixels of a smallest display unit in horizontal direction, while Q is a number of sub-pixels of a smallest display unit in vertical direction, and both in and Q are intergal that are larger than 1;
$D_H$ is the width of a smallest display unit in horizontal direction;
$D_V$ is the width of a smallest display unit in vertical direction.

Consequently, as the horizontal width of the barrier unit 33 is defined by $P_B = B_H + \overline{B}_H$, the horizonatal width of the barrier unit 33 $P_B = nB_H$.

In addition, the forgoing formulas (6) and (8) can be represented differently as following:

$$B_H = \frac{Z_0 - L_B}{Z_0} D_H \quad (13)$$

$$L_H = \frac{Z_0}{L_B} B_H \quad (14)$$

On the other hand, on the vertical direction, the aforesaid parameters in the slantwise strip parallax barrier can be defined by the following formulas:

$$B_V = \frac{Z_0 - L_B}{Z_0} mD_V \quad (15)$$

$$L_V = \frac{mD_V B_V}{mD_V - B_V} \quad (16)$$

Therefore, the relationship between $B_V$, $D_H$ and θ can be obtained by substituting the formula (9) into the formula (15), as following:

$$B_V = \frac{Z_0 - L_B}{Z_0} \frac{D_H}{\tan\theta} \quad (17)$$

The relationship between $B_H$ and $B_V$ can be obtained by dividing the formula (13) with the formula (17), as following:

$$\frac{B_H}{B_V} = \tan\theta \quad (18)$$

The relationship between $L_H$ and $L_V$ can be obtained by dividing the formula (8) with the formula (16), as following:

$$\frac{L_H}{L_V} = \tan\theta \quad (19)$$

Moreover, for those optimum viewing points $P_{k,i,j}(x_c, y_c, Z_0)$, the relationship between the parameters $x_c$, $y_c$, $L_H$ and $L_V$ are defined by the following formulas:

$$x_c = [n \times i - (n-1)/2 + j - k] \times L_H \quad (20)$$

$$y_c = k \times L_V \quad (21)$$

Wherein, n is the total view number, i is the horizontal index of viewing zone, j is the view number, k is the vertical index of viewing zone, and, the plane where all $P_{k,i,j}(x_c, y_c, Z_0)$ existed is the plane $Z=Z_0$ and is referred to as an "optimum viewing plane". Therefore, as shown in FIG. 10, when i is set to be a fixed value, and j=0, the points of $P_{k,i,j}$ construct a slanted line 20 of a slant angle θ, and on the other hand, when i is set to be a fixed value, and j=1, the points of $P_{k,i,j}$ construct another slanted line 21 of a slant angle θ.

Please refer to FIG. 11, which is a schematic diagram showing an optimum left-viewing area. As shown in FIG. 11, the optimum viewing points $P_{k,i,0}$ is distributed on the slanted line 20, i.e. every point on the slanted line 20 can be an optimum viewing point for the left eye of a viewer. Moreover, since for each and every such optimum viewing point there can be a corresponding optimum viewing area being defined, and in this case, an optimum left-viewing area as the white-colored area shown in FIG. 11. The aforesaid description also applied to an optimum right-viewing area, as shown in FIG. 12.

In FIG. 11 and FIG. 12, each of the left-viewing area and the right-viewing area is formed as a slanted strip in a horizontal width $L_H$, a vertical width $L_V$ and a slant angle θ. Thus, a viewer can simply locate his/her left eye and right eye inside the left-viewing area and the right-viewing area in respective, while maintaining both eyes roughly on a same level, (i.e. the display screen is set for landscape displaying) the viewer is able to experience and see a 3D image.

Since the view separation effect disclosed in TW Pat. Publication No. 201320717 is based upon a conventional display screen defined by $P_v=3P_H$, therefore the formula (9) and formula (19) are changed into tan θ=⅓ and $L_V=3L_H$. Consequently, when right and left eyes are vertically arranged with respect to one another (i.e. the display screen is set for portrait displaying), the viewer is not able to see 3D images since $L_V$ is way larger than IPD.

Therefore, the method for designing a parallax barrier that is disclosed in TW Pat. Publication No. 201320717 is a specific theory. That is, the parallax barriers designed based upon the formulas (6)~(19) is restricted by and corresponding to tan θ≤⅓. Moreover, since Q is defined to be an integer, the change of the slant angle θ is restricted. In addition, the design principle based upon the formulas (6)~(19) can not cover all the slant-and-step parallax barrier designs, neither did it cover all the view separation devices that are composed of lenticular.

SUMMARY OF THE INVENTION

In view of the disadvantages of prior art, the primary object of the present invention is to provide a method for displaying a three-dimensional (3D) image, which is further composed of a multi-view 3D image combination method and a parallax barrier structure design, and is being used in a case when a common flat-panel display screen and a view separation device are used to display a 3D image.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein:

Figure 6:
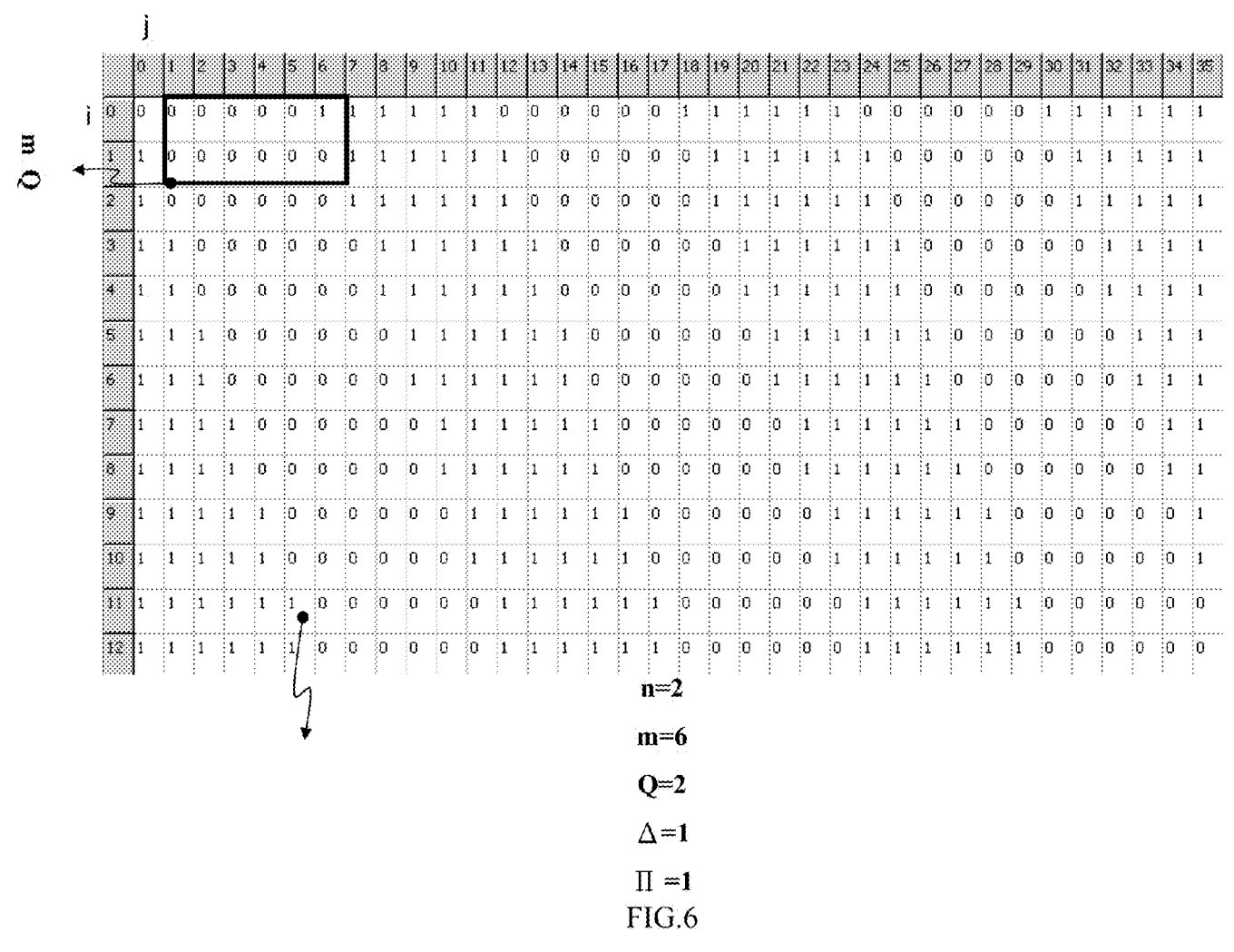

FIG. 6 is a schematic diagram showing a 2-view combined 3D image, whereas n=2, m=6, Q=2, Δ=1, and Π=1.

Figure 19:
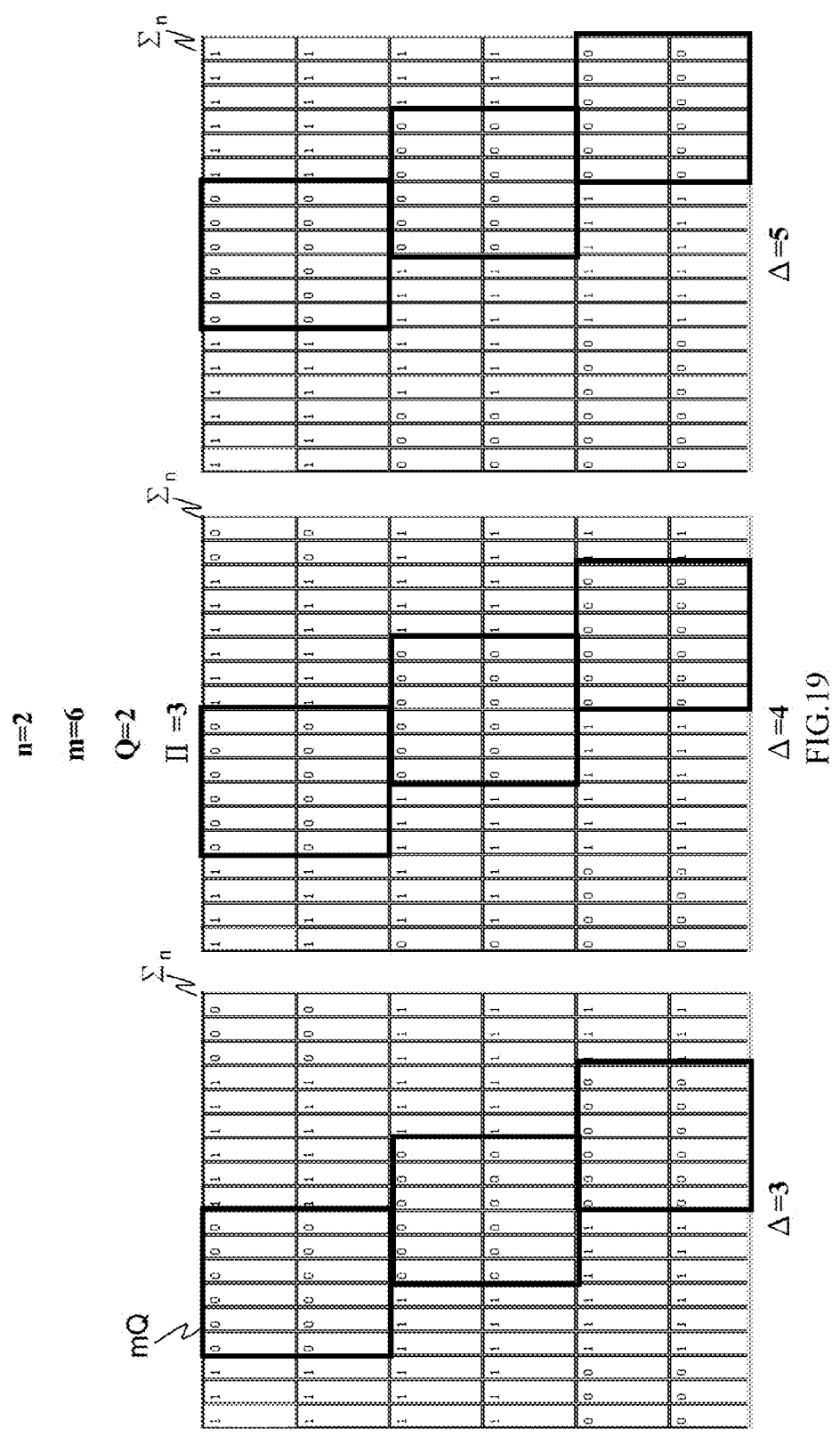

FIG. 16 to FIG. 20 are schematic diagrams showing exemplary 3D combined images having a feature of slanting to the right.

Figure 23:
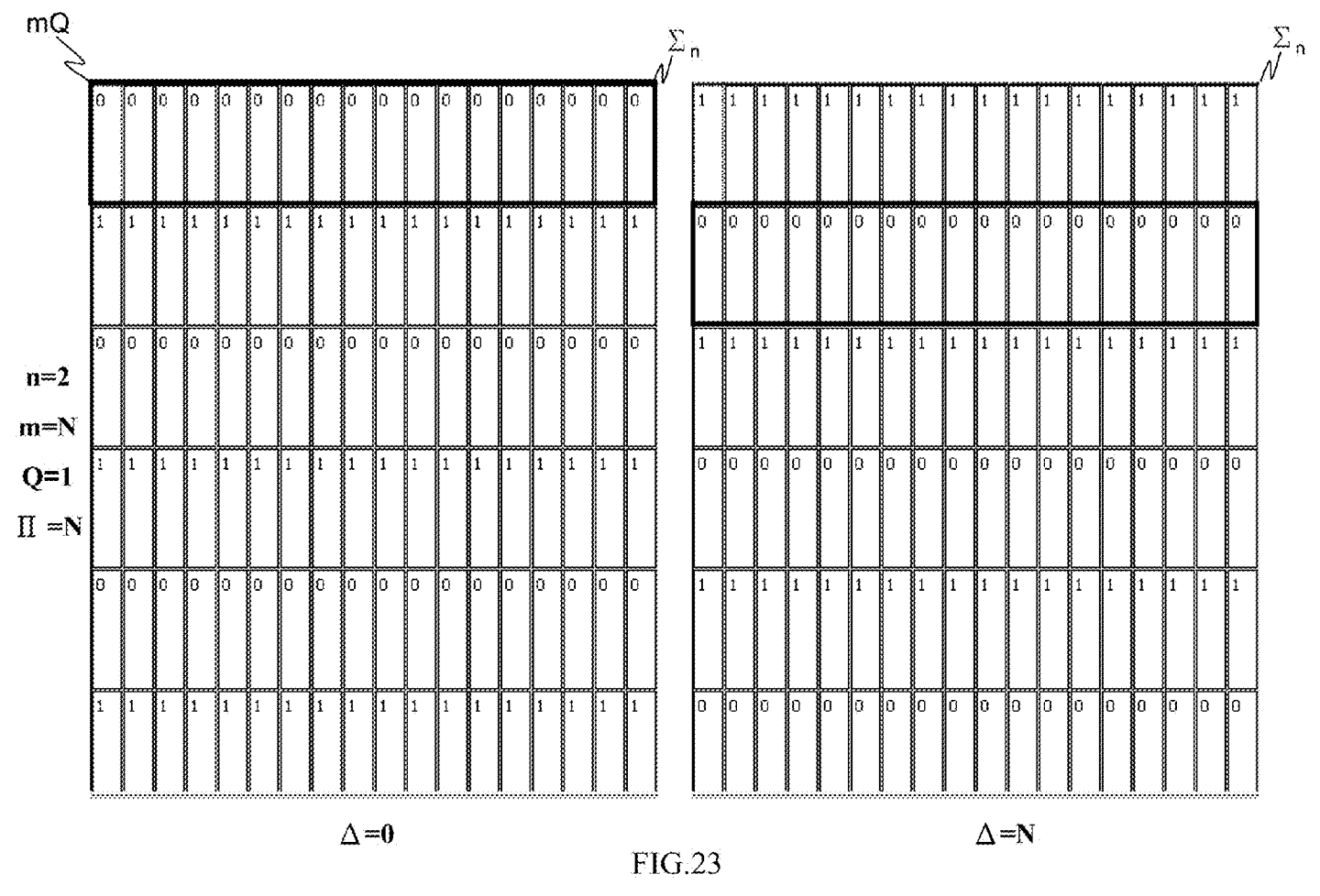

FIG. 23 is a schematic diagram illustrating a 3D image format for 3D polarization glasses.

FIG. 24 is a schematic diagram showing an exemplary multi-view 3D combined images having a feature of slanting to the right with a=2, b=1, c=7, d=7, n=7, m=1, Q=1, Π=1 and Δ=0.

FIG. 25 is a schematic diagram showing an exemplary multi-view 3D combined images having a feature of slanting to the right with a=2, b=1, c=7, d=7, n=7, m=1, Q=1, Π=1 and Δ=1.

FIG. 28 is a schematic diagram showing an exemplary multi-view 3D combined images having a feature of slanting to the right with a=2, b=1, c=7, d=7, n=7, m=1, Q=2, Π=1 and Δ=0.

FIG. 29 is a schematic diagram showing an exemplary multi-view 3D combined images having a feature of slanting to the right with a=2, b=1, c=7, d=7, n=7, m=1, Q=2, Π=1 and Δ=1.

FIG. 35 is a schematic diagram showing the optical characteristic of cylindrical lenses.

FIG. 36 is a schematic diagram showing an optimum viewing plane of Lenticular.

DESCRIPTION OF THE EXEMPLARY EMBODIMENTS

Figure 1:
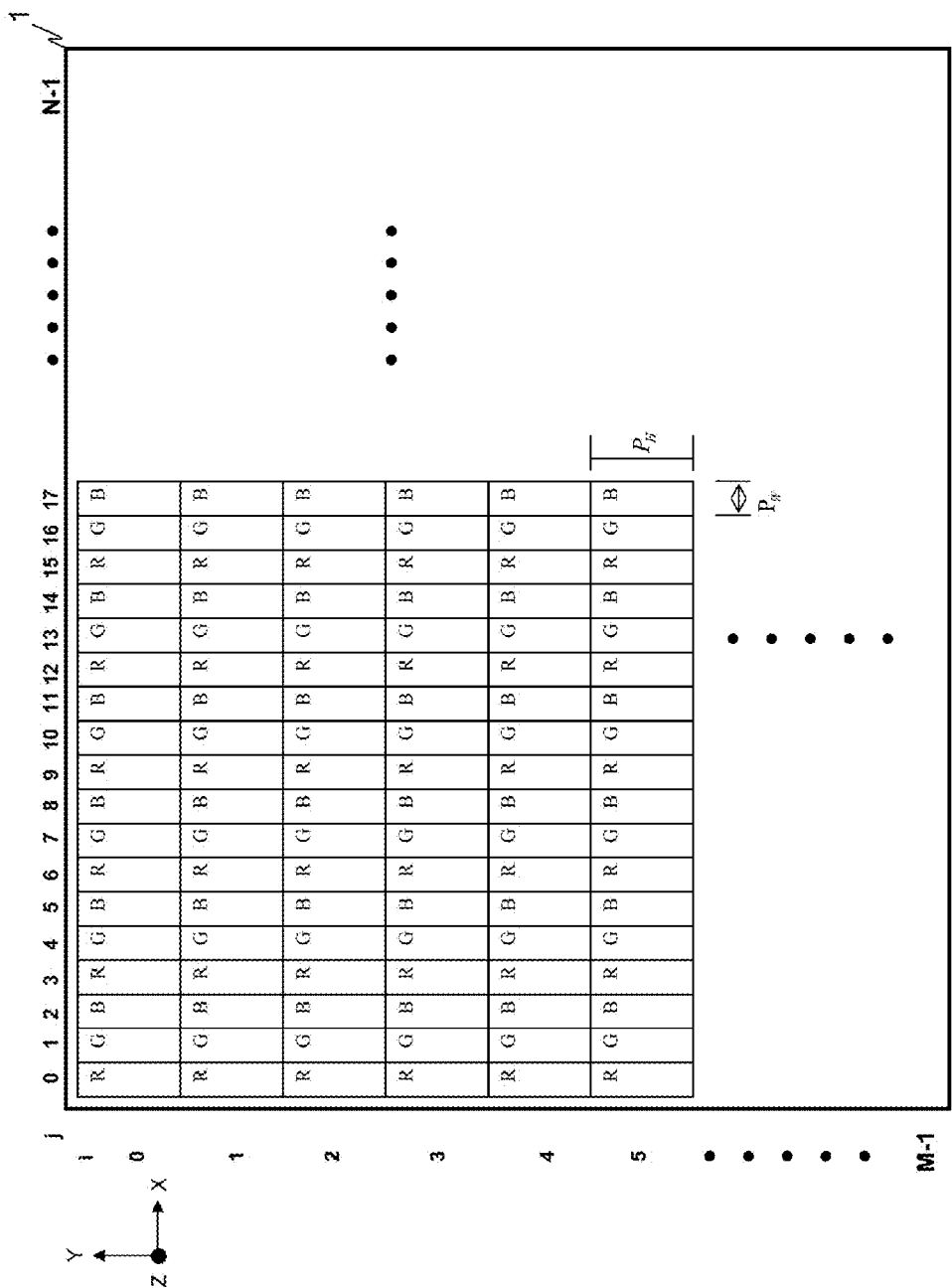
FIG. 1 is a schematic view of a sub-pixel arranged of R, G, and B colors in vertical strip configuration.
Figure 2:
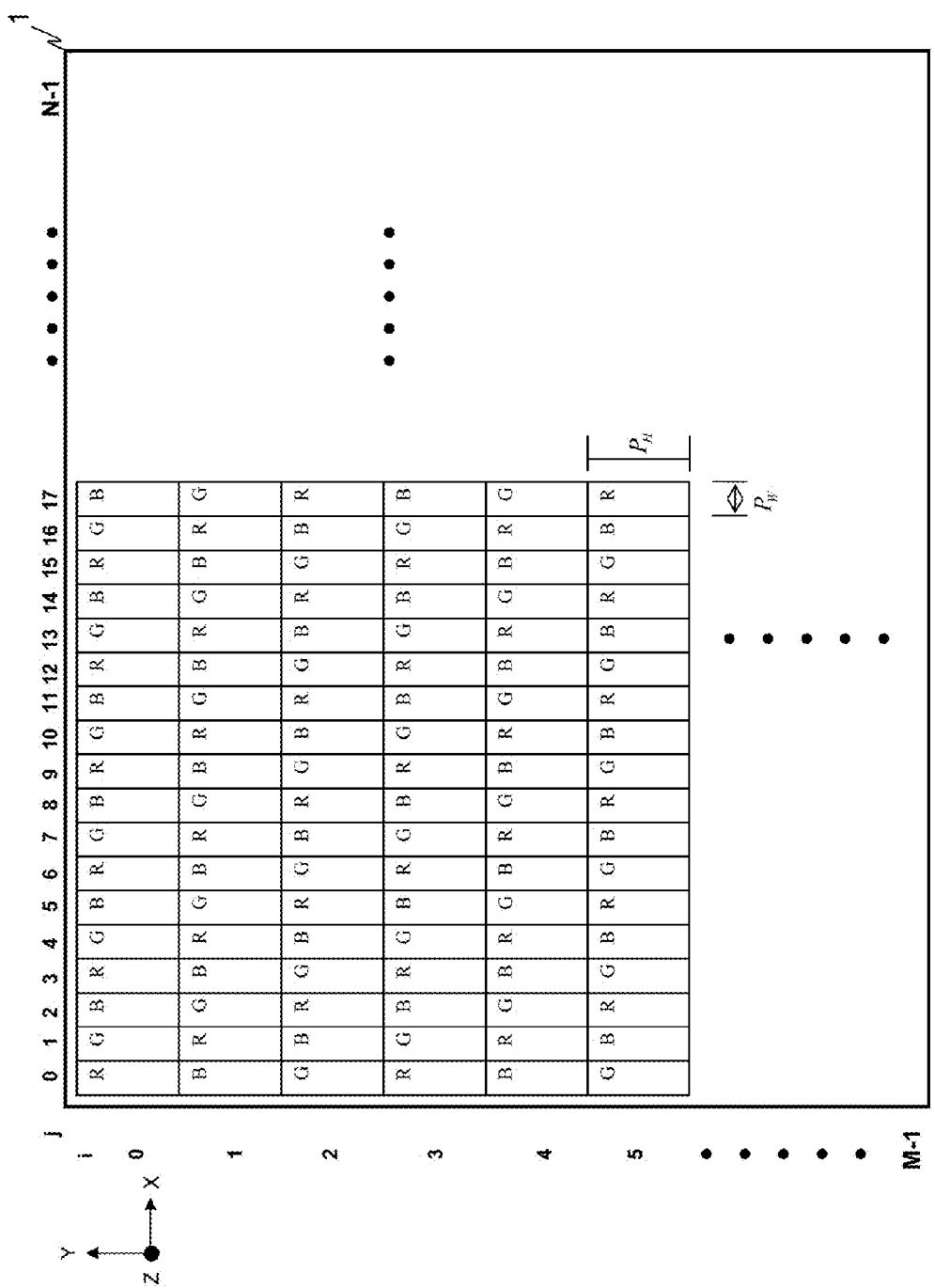
FIG. 2 is a schematic view of a sub-pixel arranged of R, G, and B colors in mosaic strip configuration.
Figure 3:
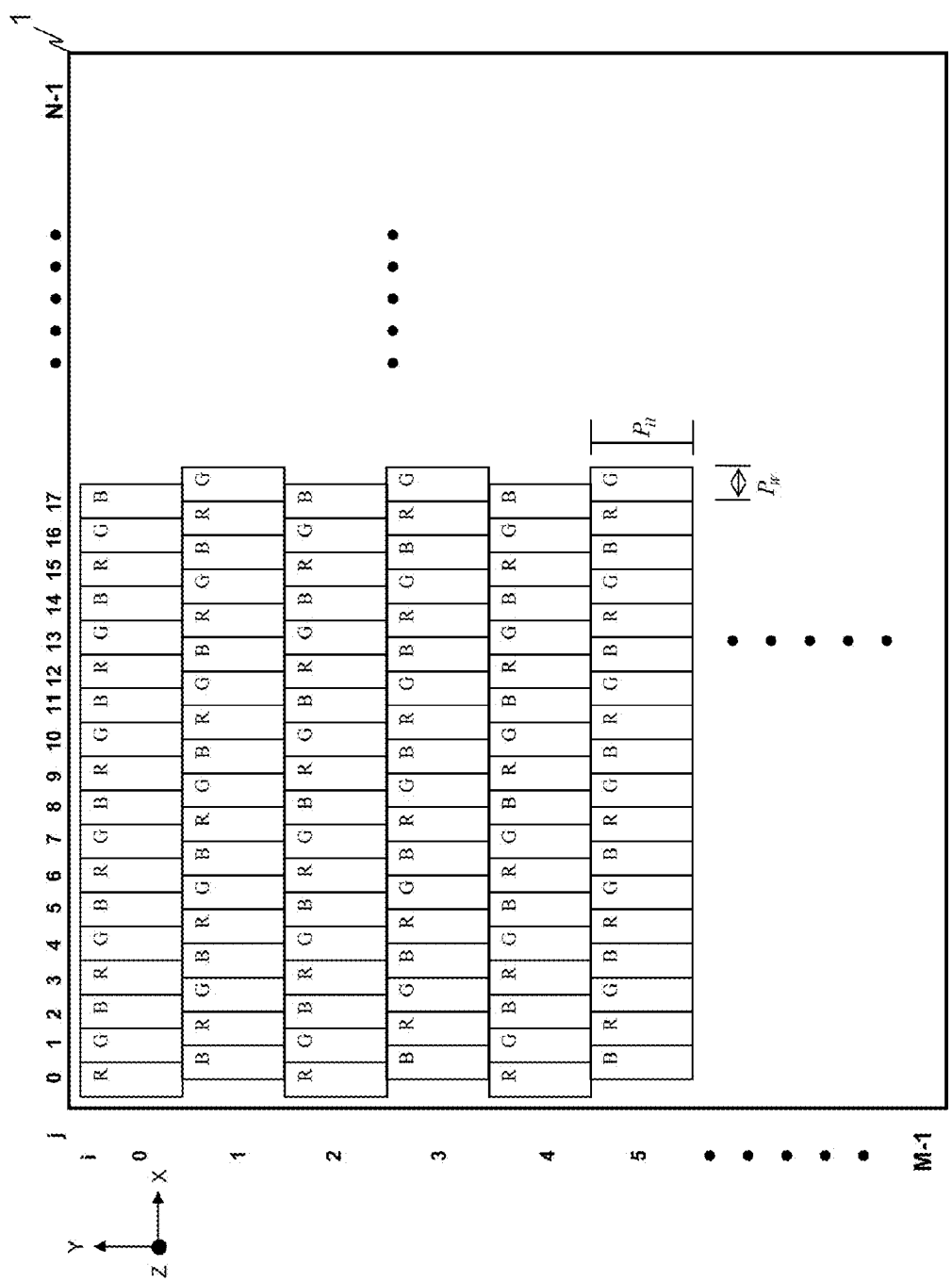
FIG. 3 is a schematic view of a sub-pixel arranged of R, G, and B colors in delta configuration.
Figure 4:
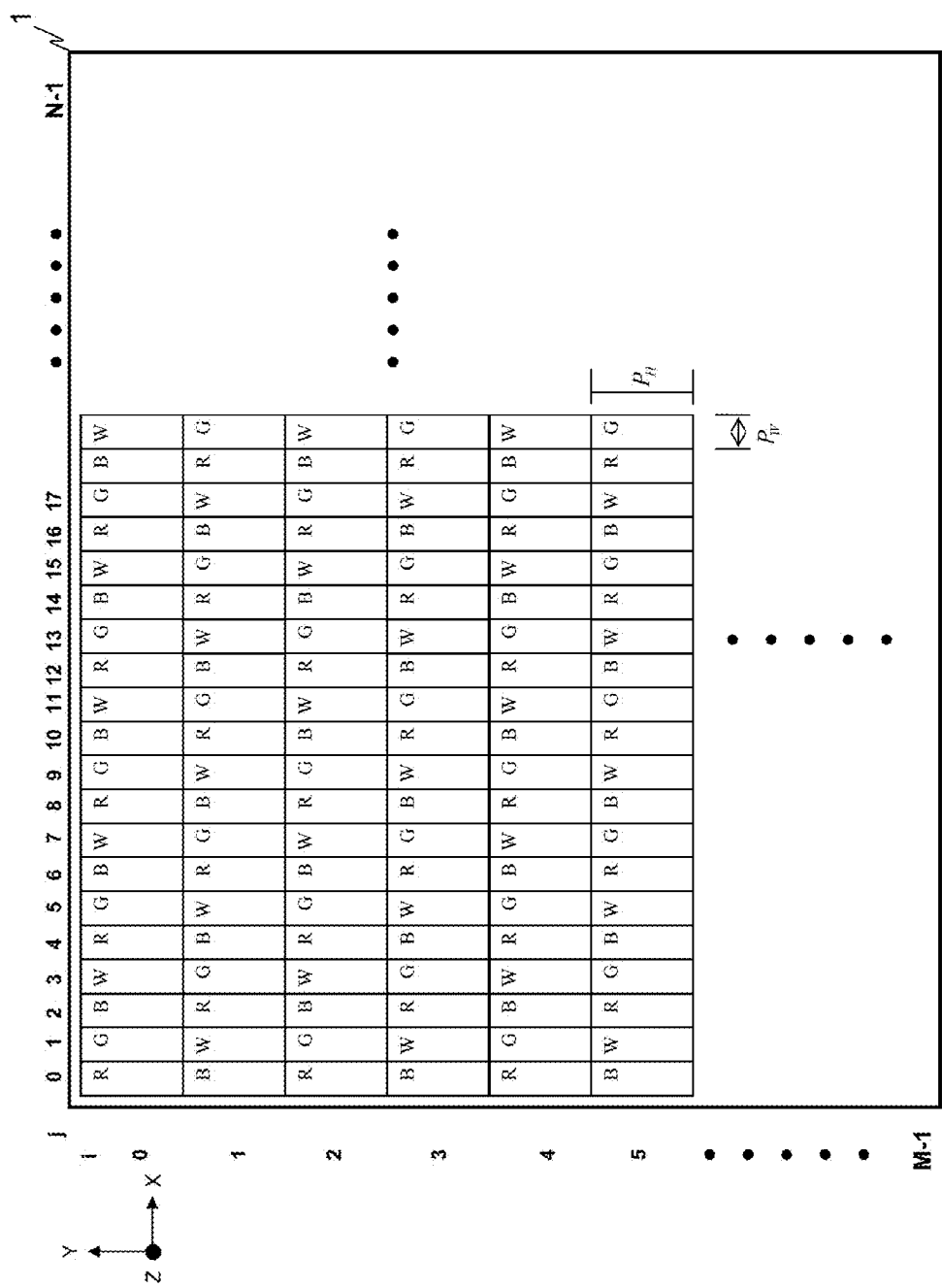
FIG. 4 is a schematic view of a sub-pixel arranged of R, G, and B colors in pentile configuration.
Figure 5:
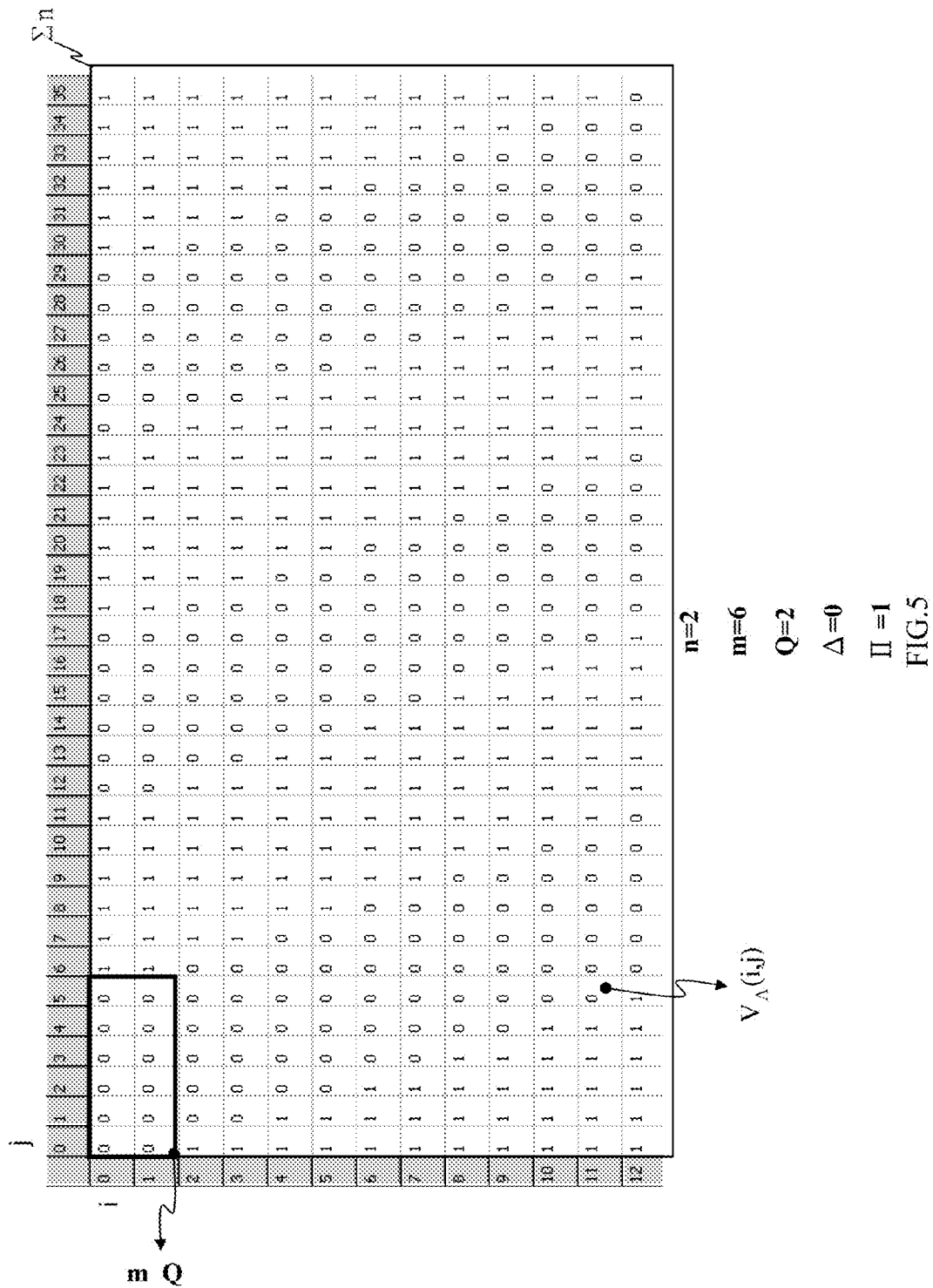
FIG. 5 is a schematic diagram showing a 2-view combined 3D image, whereas n=2, m=6, Q=2, Δ=0, and Π=1.
Figure 7:
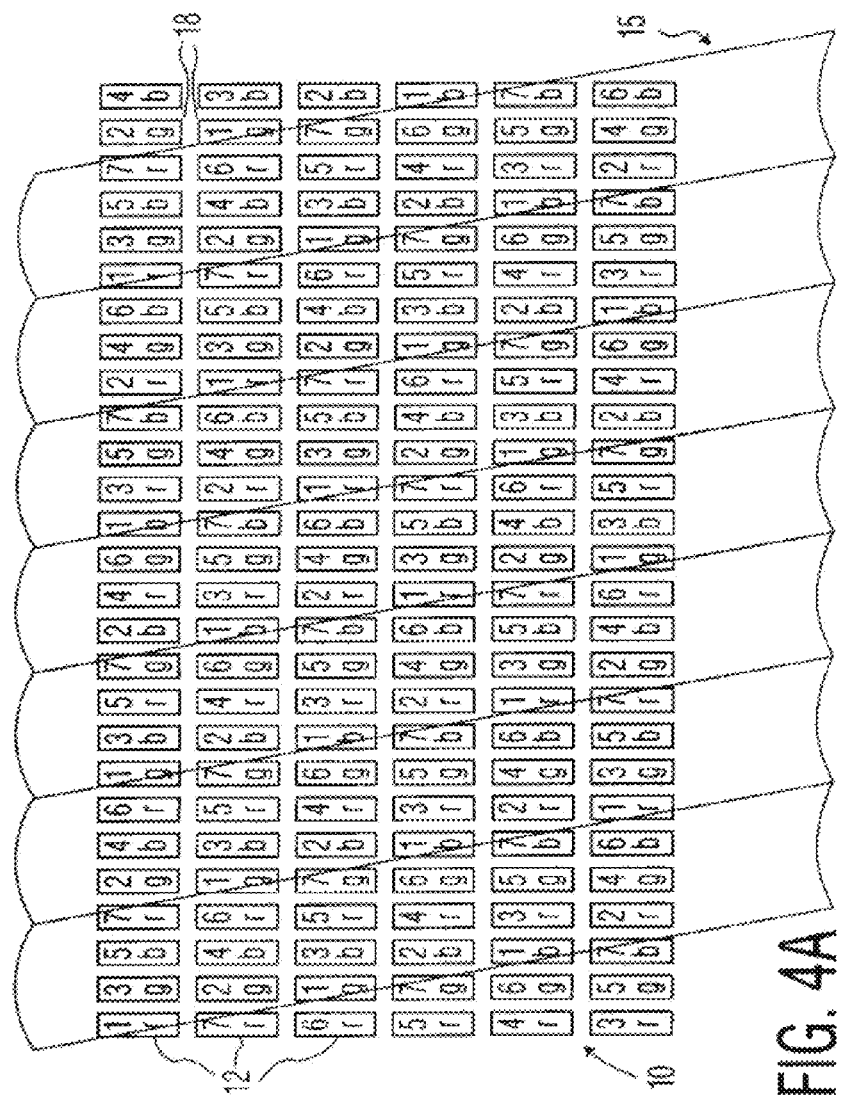
FIG. 7 is a schematic diagram showing a multi-view combined 3D image disclosed in U.S. Pat. No. 6,064,424.

For your esteemed members of reviewing committee to further understand and recognize the fulfilled functions and structural characteristics of the invention, several exemplary embodiments cooperating with detailed description are presented as the follows.

The following description provides details of a multi-view 3D image combination method and a parallax barrier structure design method that are used in the present invention.

In the multi-view 3D image combination method, similarly, an image V displayed on a display screen, a single-view image $V_k$, and a multi-view combined 3D image $\Sigma_n$ can be represented as following:

$$V = \sum_{i=0}^{M-1}\sum_{j=0}^{N-1} V(i,j) \quad (22)$$

$$V_k = \sum_{i=0}^{M-1}\sum_{j=0}^{N-1} V_k(i,j) \quad (23)$$

$$\Sigma_n = \sum_{i=0}^{M-1}\sum_{j=0}^{N-1} V_\Lambda(i,j) \quad (24)$$

wherein, for the multi-view combined 3D images having a feature of slanting to the right, the index Λ is defined as:

$$\Lambda = \mathrm{Mod}=\left[\mathrm{int}\!\left(\frac{j - \Pi\times\mathrm{int}\!\left(\frac{i}{Q}\right) - \Delta}{m}\right), n\right] \quad (25)$$

In addition, for the multi-view combined 3D images having a feature of slanting to the left, the index Λ is defined as:

$$\Lambda = \mathrm{Mod}\!\left[\mathrm{int}\!\left(\frac{(N-1) - j - \Pi\times\mathrm{int}\!\left(\frac{i}{Q}\right) - \Delta}{m}\right), n\right] \quad (26)$$

Moreover, in the aforesaid formulas, the flat-panel display screen is composed of N×M sub-pixels, in which N represents the total number of sub-pixels in a horizontal direction (X axis) of the display screen, and M represents the total number of sub-pixels in a vertical direction (Y axis) of the display screen; in addition, the horizontal position and the vertical position of any single sub-pixel in N×M display screen are represented respectively using the index i and j, whereas 0≤j≤N−1 and 0≤i≤M−1; and $V_\Lambda(i, j)$ represents the sub-pixel image data of a single-view image $V_\Lambda$ at position (i, j) of the display screen; Λ represents a view number, and 0≤Λ<n, while n is the total amount of view; m is a positive integer representing a number of sub-pixels of a smallest display unit in horizontal direction, while Q is a positive integer representing a number of sub-pixels of a smallest display unit in vertical direction; Δ is an integer representing a horizontal displacement phase; Π is an integer representing a horizontal displacement amplitude; k is a view number and 0≤k<n; and int is a round down integer function, and Mod is a function of taking a remainder.

By varying the parameters in the aforesaid formulas (25) and (26), there can be correspondingly a variety of multi-view combined 3D images being generated and displayed, as shown in FIG. 13 to FIG. 23. Similarly, when the sub-pixel image data at a position (i, j) of the display screen is replaced by the view numbers, i.e. $V_\Lambda(i, j)=\Lambda$, the origin of the image at the position (i, j) relating to whether it is obtained from a left-view image or a right image is clearly indicated, and thus also the overall structural characteristic of the combined 3D image can be clearly demonstrated.

Figure 13:
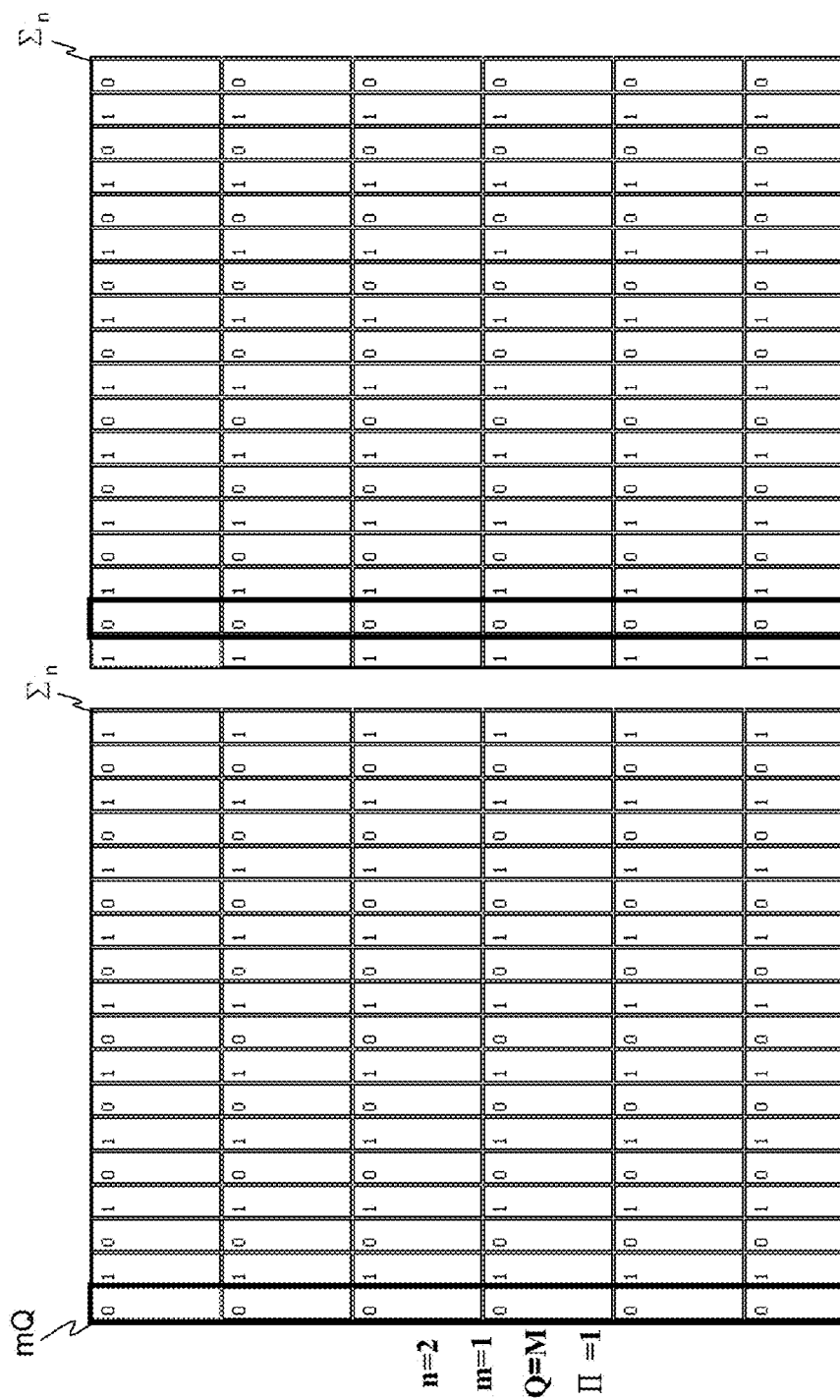
FIG. 13 to FIG. 15 are schematic diagrams showing exemplary 3D combined images having a feature of vertical strip.
Figure 14:
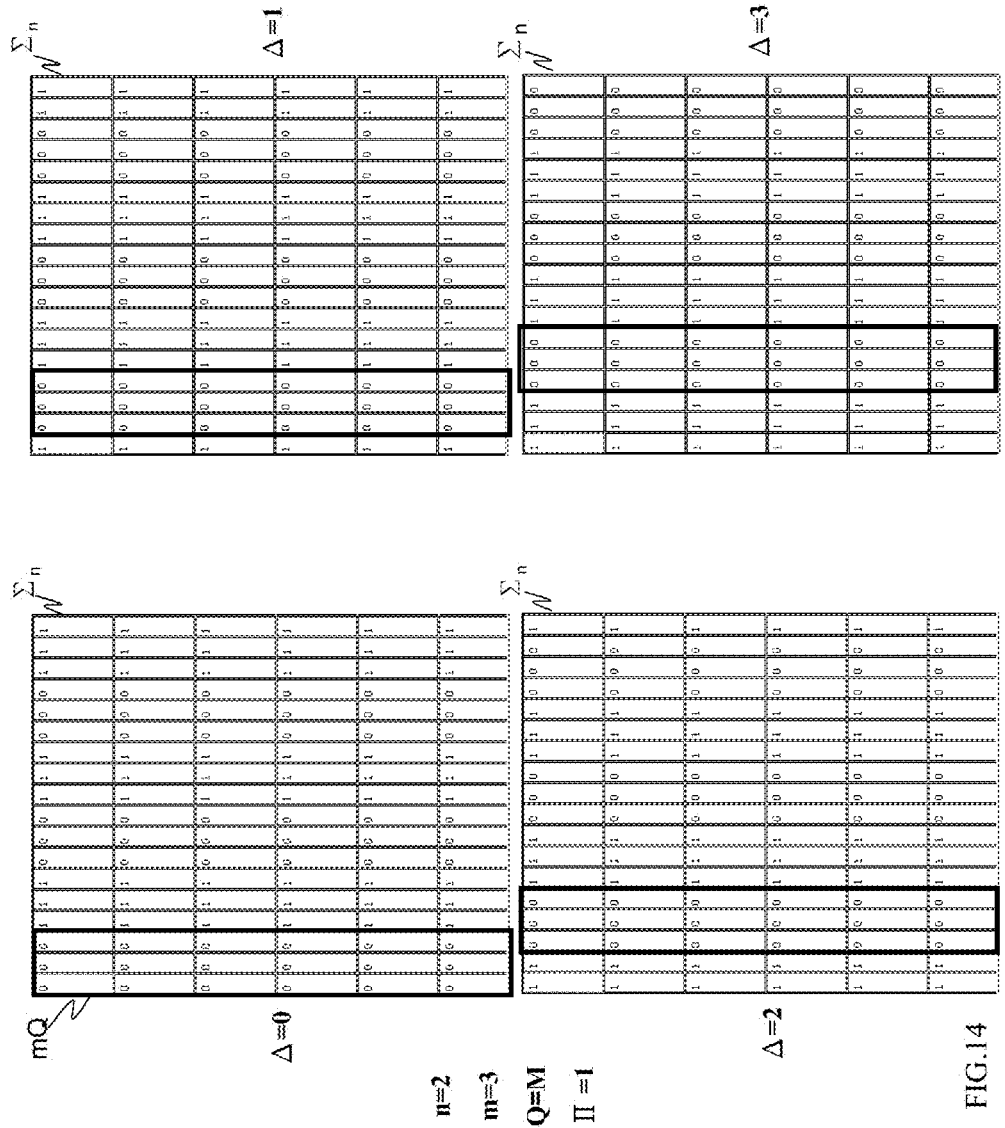
Figure 15:
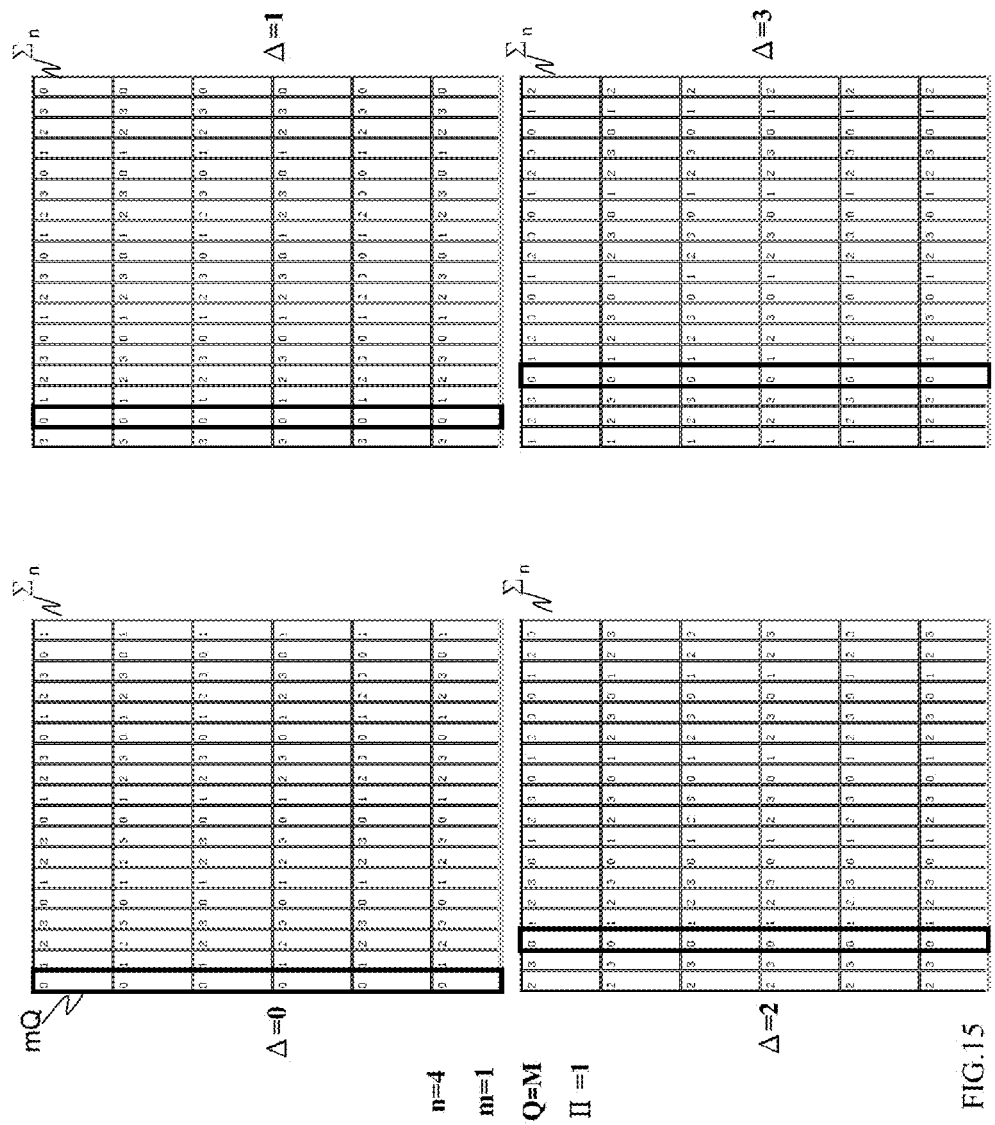
Figure 21:
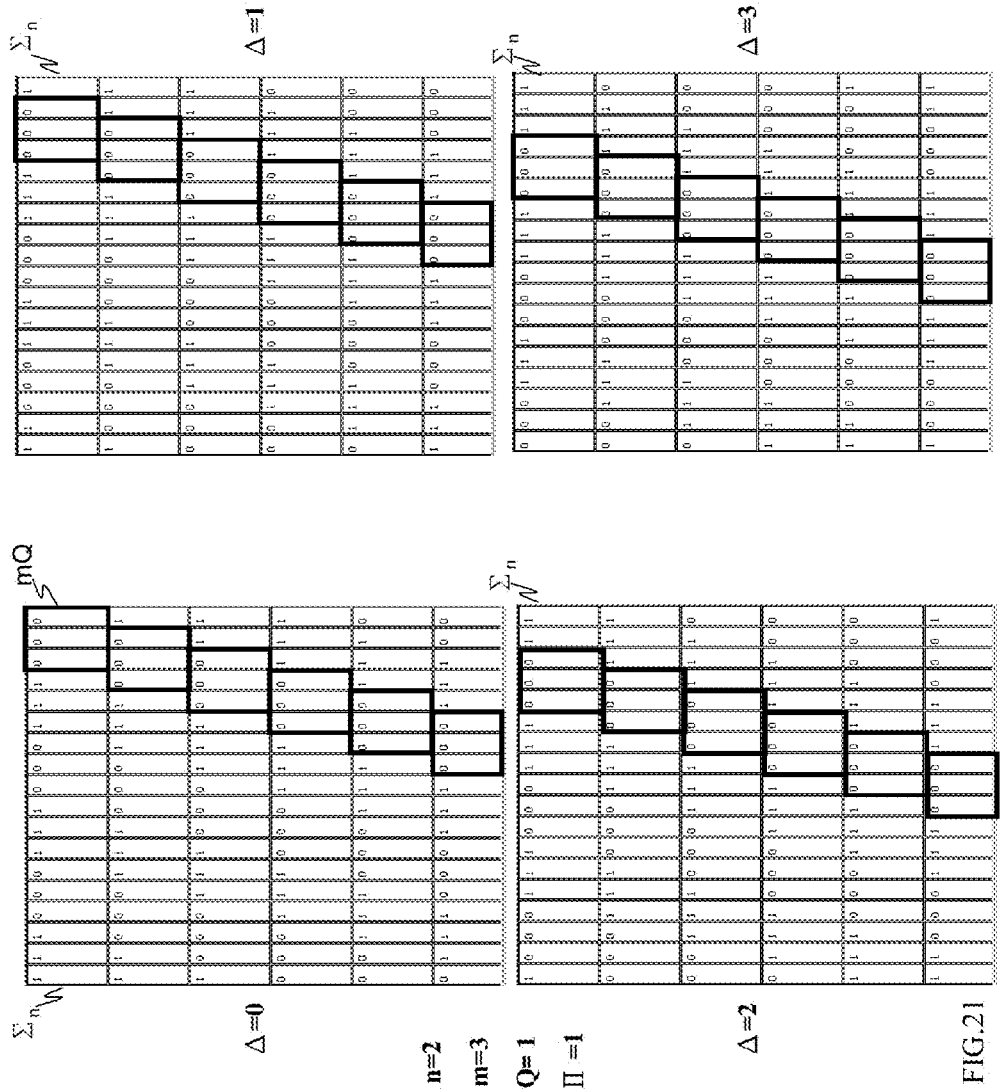
FIG. 21 is a schematic diagram showing an exemplary 3D combined image having a feature of slanting to the left.
Figure 22:
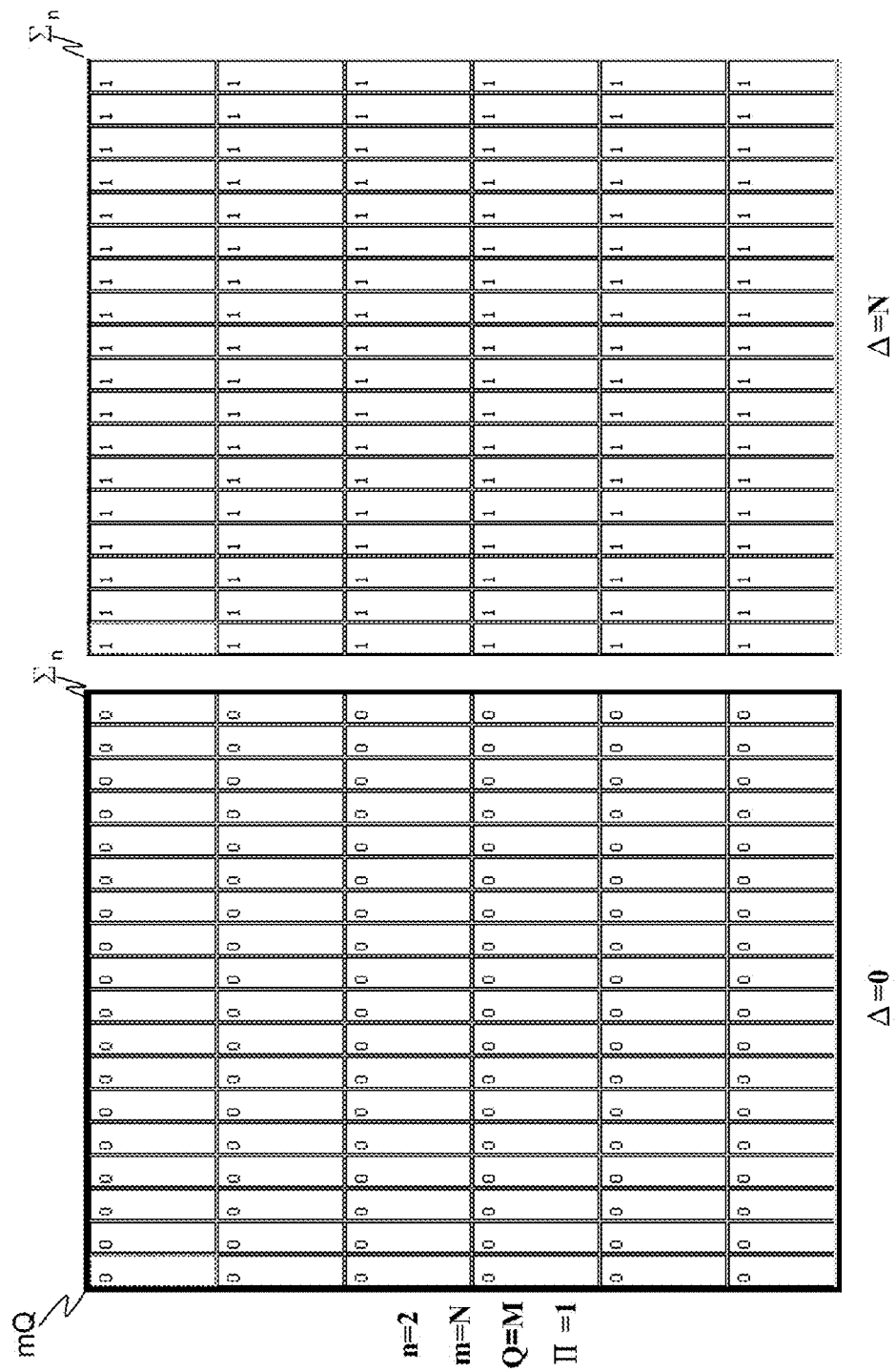
FIG. 22 is a schematic diagram illustrating a 3D image format for 3D shutter glasses.
Figure 26:
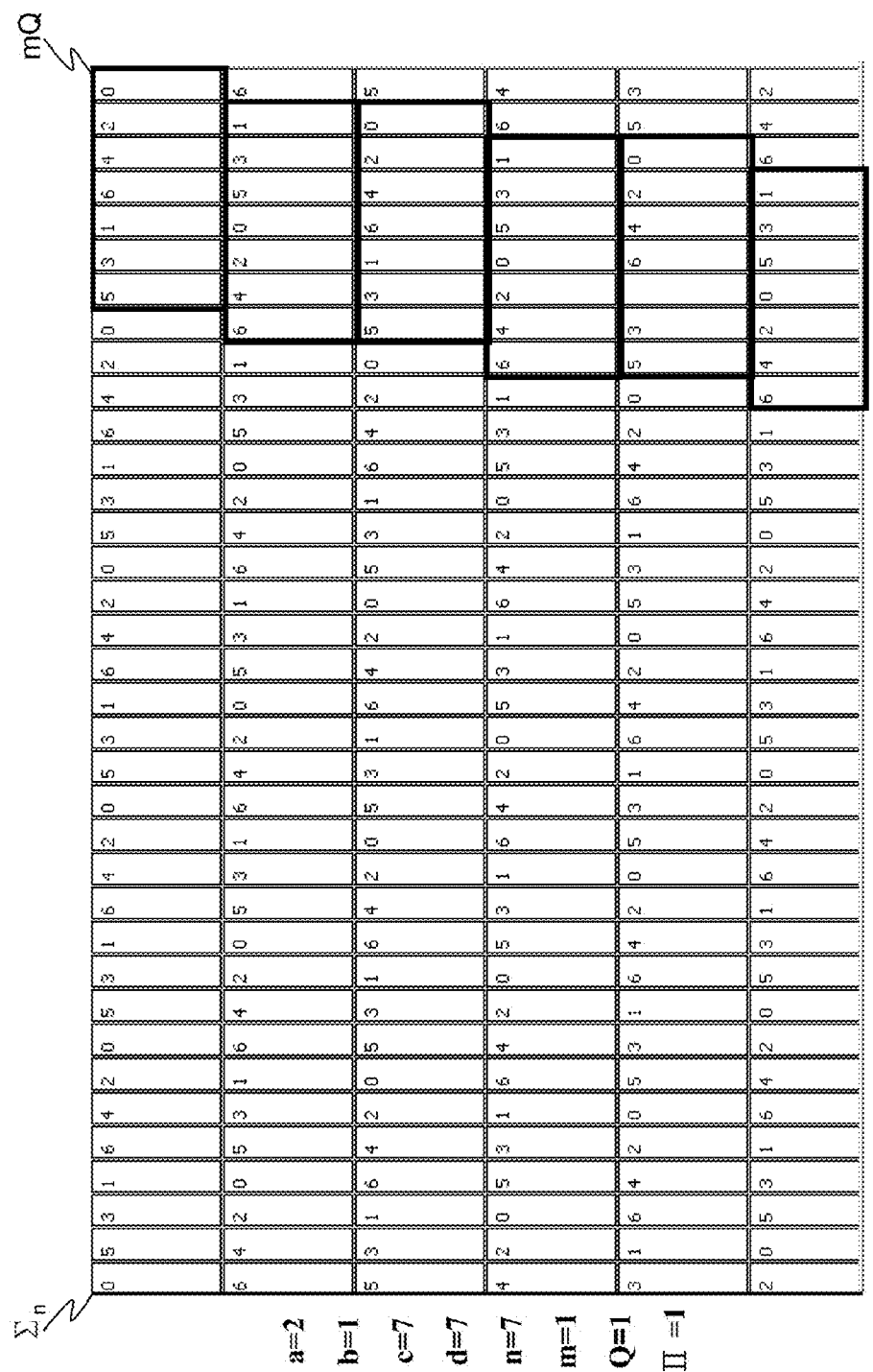
FIG. 26 is a schematic diagram showing an exemplary multi-view 3D combined images having a feature of slanting to the left with a=2, b=1, c=7, d=7, n=7, m=1, Q=1, Π=1 and Δ=0.
Figure 27:
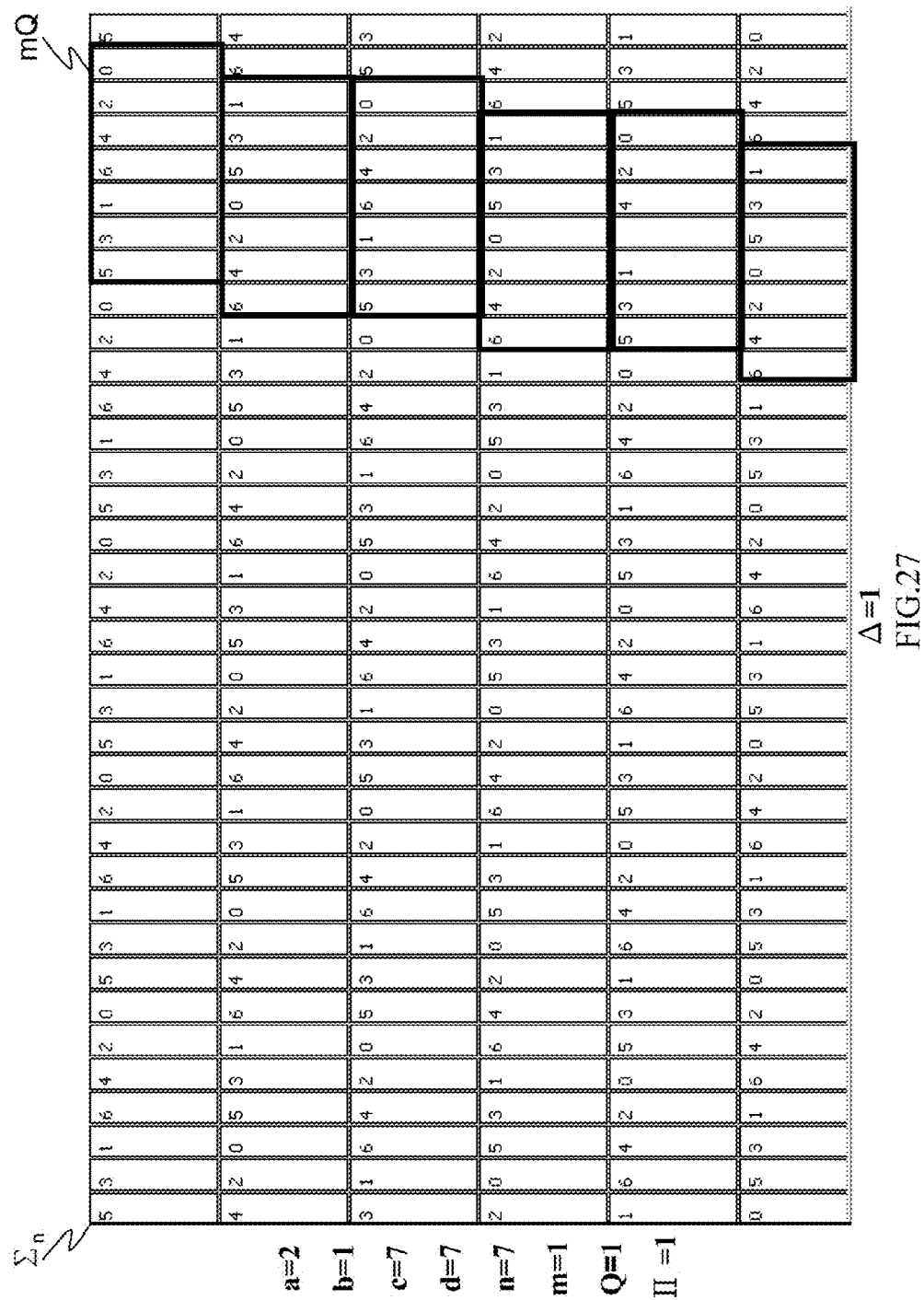
FIG. 27 is a schematic diagram showing an exemplary multi-view 3D combined images having a feature of slanting to the left with a=2, b=1, c=7, d=7, n=7, m=1, Q=1, Π=1 and Δ=1.

For the combined 3D images $\Sigma_n$ shown in FIG. 13 to FIG. 15, they are obtained in correspondence to the use of a vertical strip parallax barrier; For the combined 3D images $\Sigma_n$ having a feature of slanting to the right that are shown in FIG. 16 to FIG. 20, they are obtained in correspondence to the use of a right-slantwise strip parallax barrier or a right-slant-and-step parallax barrier; For the combined 3D images $\Sigma_n$ having a feature of slanting to the left that are shown in FIG. 21, they are obtained in correspondence to the use of a left-slantwise strip parallax barrier or a left-slant-and-step parallax barrier. Wherein, mQ represents a smallest display unit, i.e. a smallest display unit is composed of mQ sub-pixels; and by the changing of the a horizontal displacement phase Δ, the displaying positions of the mQ sub-pixels will be affected accordingly so as to resolve the shortcomings relating to the aforesaid formulas (4), (5).

For the application of 3D goggles, the aforesaid formulas (25), (26) are also applicable. Please refer to FIG. 22, which is a schematic diagram illustrating a 3D image format for 3D shutter glasses, and is generally used in a Page Flipping mode in 3D display. Page flipping is a method of producing time-sequential stereoscopic display that works by flipping between two pages of video memory every time a new image is to be displayed, whereas one 'page' will hold the left perspective image and the other 'page' will hold the right perspective image. Please refer to FIG. 23, which is a schematic diagram illustrating a 3D image format for 3D polarization glasses that is generally referred as a horizontally interlaced image format. Nevertheless, the aforesaid formulas (25), (26) can also be applicable to vertical strip, right-slantwise strip lenticular, right-slant-and-step lenticular, left-slantwise strip lenticular and left-slant-and-step lenticular. Moreover, the aforesaid formulas (25), (26) can also be applicable to enable either a landscape displaying or a portrait displaying, only if all the single-view images can be rotated by 90 degrees before they are combined into 3D images using aforesaid formulas (25), (26).

For the multi-view 3D combined images disclosed in U.S. Pat. No. 6,064,424, there can be further a calculation performed based upon the following formula:

$$\Lambda' = \text{Mod}\left[\left(a\Lambda + b\text{Mod}\left(\text{int}\left(\frac{i}{Q}\right), c\right)\right), d\right] \quad (27)$$

Figure 24:
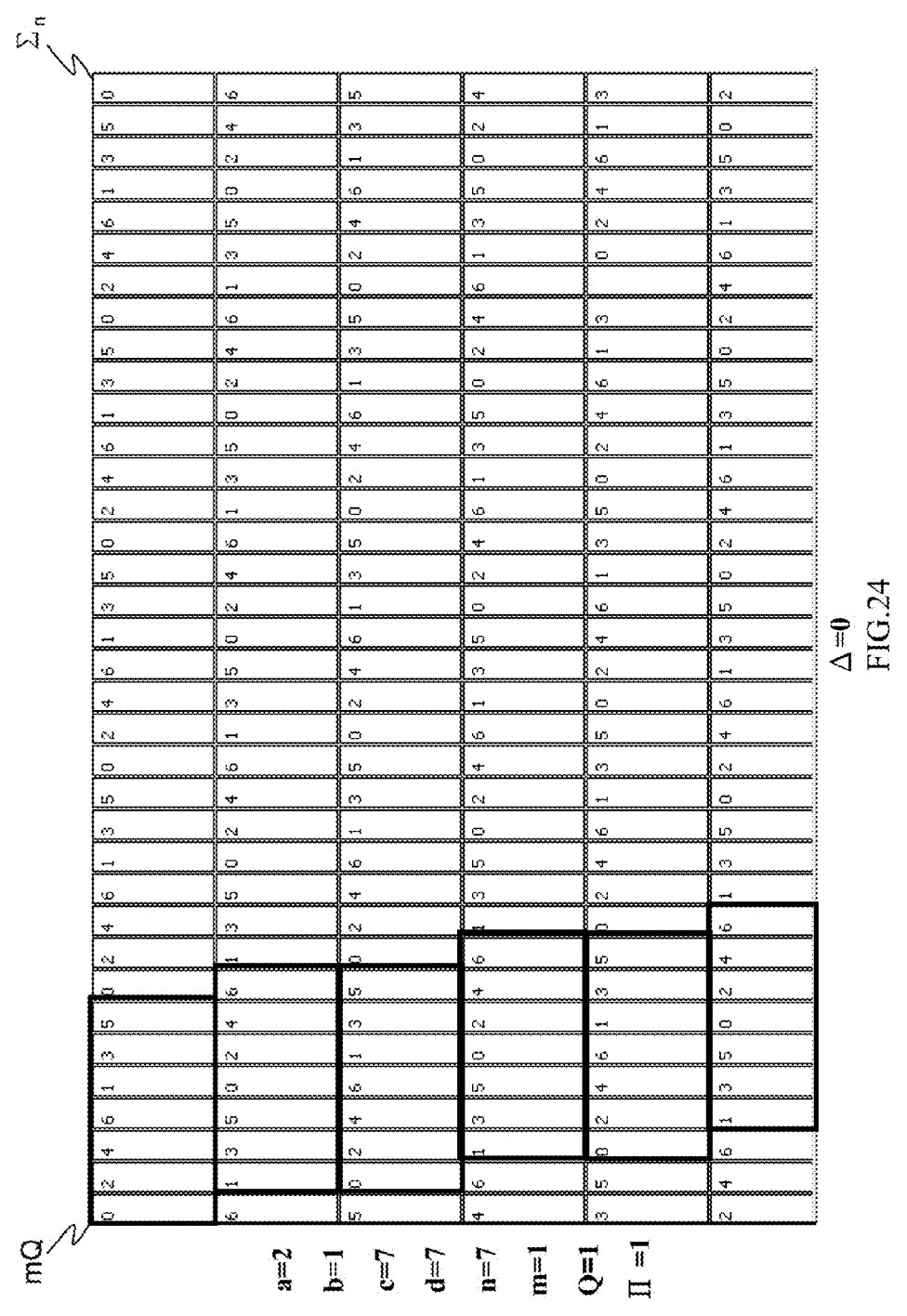
Figure 25:
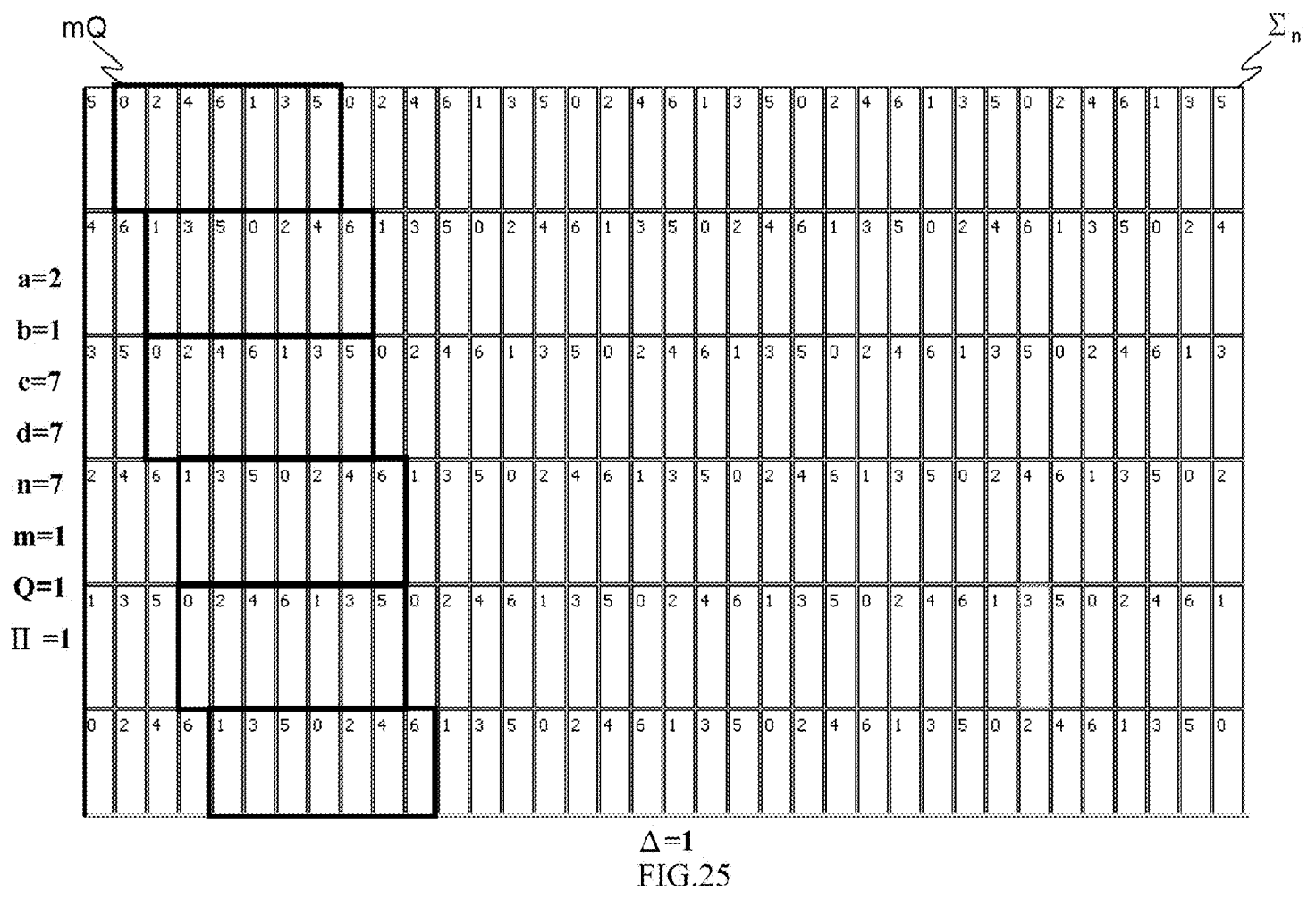
Figure 28:
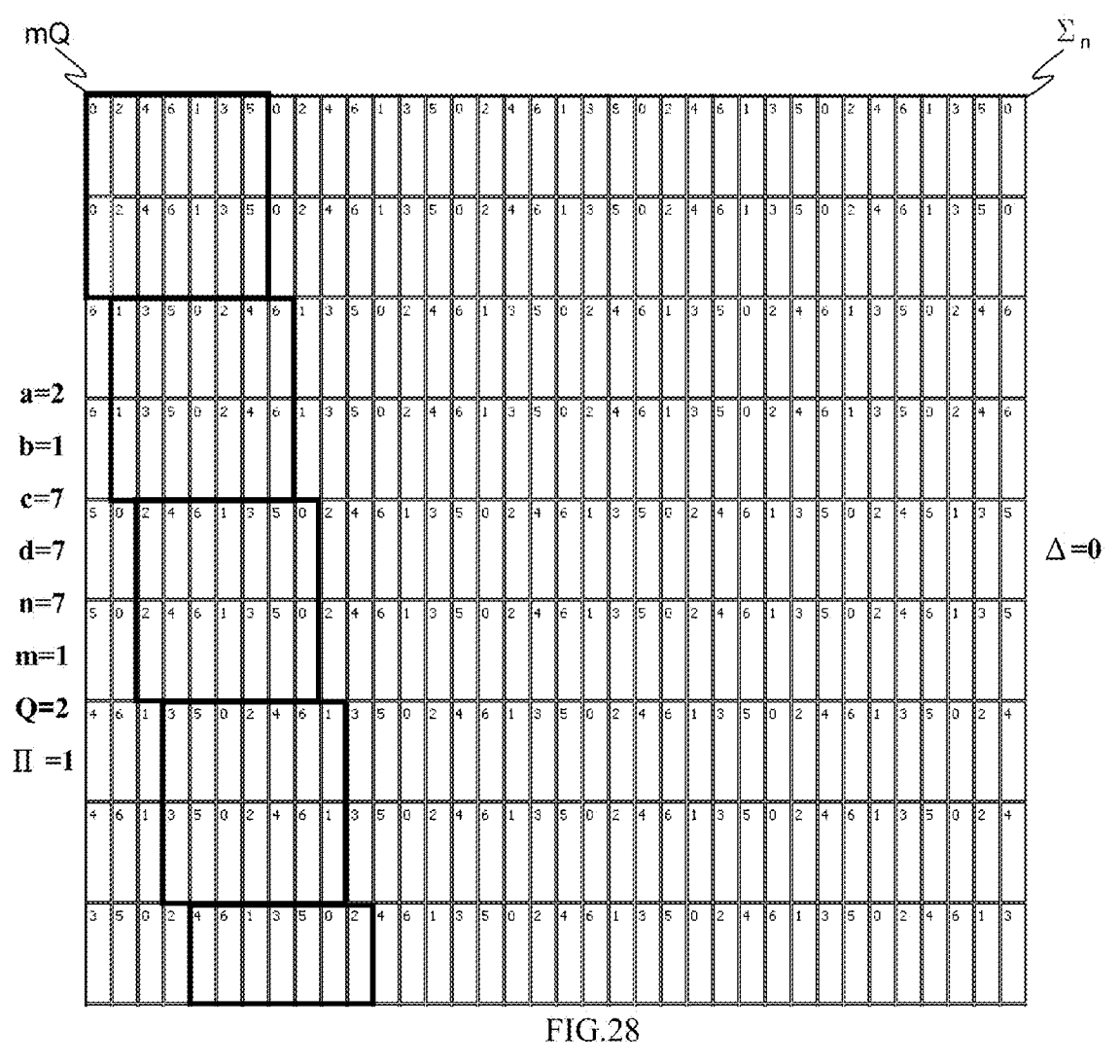
Figure 29:
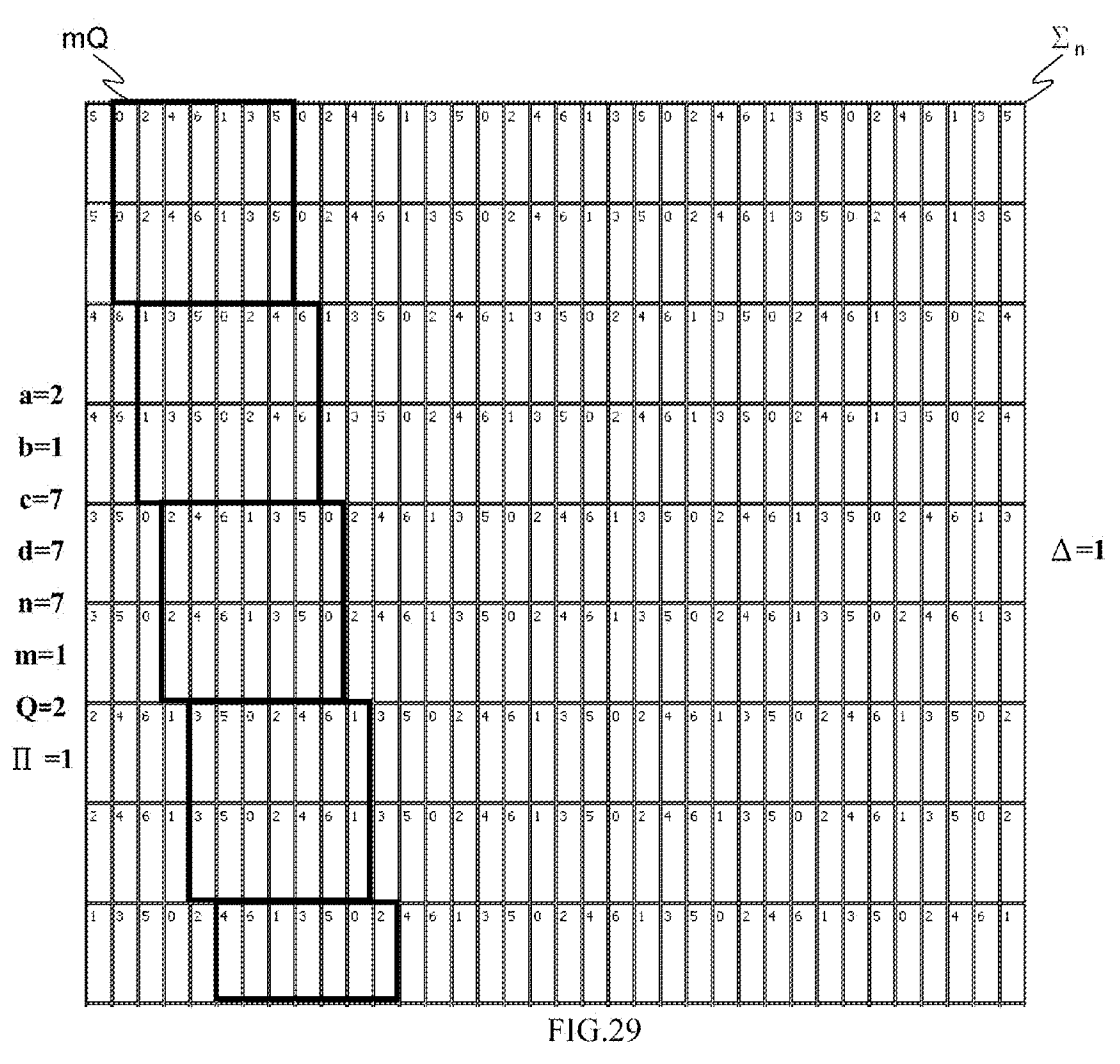

Wherein, $\Lambda$ is generated using the aforesaid formulas (25), (26); a, b, c, d is a set of control constants. When a=1, b=0, c=arbitrary integer, d≥n, the calculation resulting from the formula (27) is the same as that of the formulas (25), (26), and on the other hand, when a=2, b=1, c=n, d=n, a multi-view 3D combined image disclosed in U.S. Pat. No. 6,064,424 can be resulted, as shown in FIG. 24. Consequently, it can be concluded that the multi-view 3D combined images disclosed in U.S. Pat. No. 6,064,424 are only specific examples that can be generated using the formulas (25), (26) and (27). Moreover, as shown in FIG. 25, it is noted that the difference between the U.S. Pat. No. 6,064,424 and those resulting from the aforesaid formulas (25), (26) and (27) is caused only from the difference in the numbering of view number, so that it can be resolved simply by adding 1 to the view number of FIG. 25. In addition, the formulas (25), (26) and (27) are more powerful and effective as they can be used for generating more 3D combined images of different characteristics, as shown in FIG. 26 to FIG. 29.

To sum up, by the use of the formulas (25), (26) and (27), a variety of 3D combined images can be generated in correspondence to the use of a vertical strip parallax barrier, a right-slantwise strip parallax barrier, a right-slant-and-step parallax barrier, a left-slantwise strip parallax barrier, a left-slant-and-step parallax barrier. In addition, by the changing of the a horizontal displacement phase $\Delta$, i.e. the horizontal displacement phase $\Delta$ is defined to be a variable of time $\Delta(t)$, the resulting 3D combined image can be shifted horizontally, and thus an objective of dynamic 3D image combination can be achieved.

In responsive to the application insufficiency of the aforesaid parallax barrier, a more general method, such as a parallax barrier structure design method, is provided for satisfying the requirements of all kinds of display screens, all kinds of 3D combined images in single-directional displaying and/or dual-directional image displaying. In the parallax barrier structure design method, a slant angle $\theta$ is first to be defined using the following formulas:

$$\tan\theta = q\frac{D_H}{D_V} \quad (28)$$

$$D_H = mP_H \quad (29)$$

$$D_V = QP_V \quad (30)$$

wherein, q represents a rate of inclination; and moreover, and when q>0, the slant angle $\theta$ defines a angle representing a feature of slanting to the left; when q<0, the slant angle $\theta$ defines a angle representing a feature of slanting to the right; and when q=0, the slant angle $\theta$ defines a feature of no slanting.

Moreover, on the horizontal direction, the parameters for designing a parallax barrier are defined by the following formulas:

$$B_H = \frac{D_H L_H}{D_H + L_H} = \frac{Z_0 - L_B}{Z_0}D_H \quad (31)$$

$$\overline{B}_H = (n-1)B_H \quad (32)$$

$$L_H = \frac{D_H B_H}{D_H - B_H} = \frac{Z_0}{L_B}B_H \quad (33)$$

$$Z_0 = \frac{D_H}{D_H - B_H}L_B \quad (34)$$

On the other hand, on the vertical direction, the parameters for designing a parallax barrier are defined by the following formulas:

$$B_V = \frac{B_H}{\tan\theta} \quad (35)$$

$$L_V = \frac{L_H}{\tan\theta} \quad (36)$$

Figure 30:
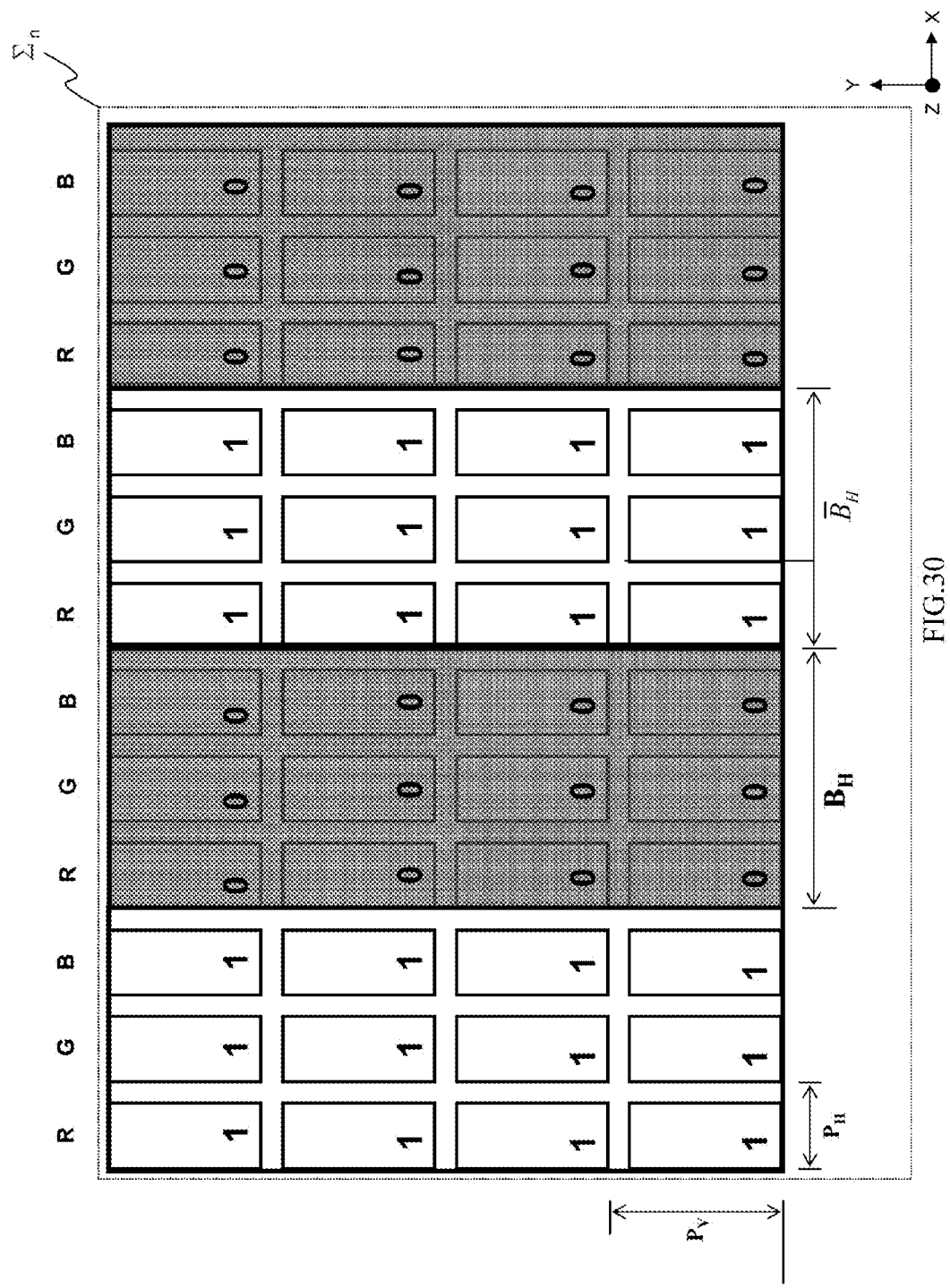
FIG. 30 is a schematic diagram showing the structure of a vertical strip parallax barrier.

As for the formulas (28)~(36), if q=0, then tan $\theta$=0, i.e. $\theta$=0°; and thereafter, according to the formulas (35) and (36) when tan $\theta$=0, then $B_V$=∞ and $L_V$=∞. Thus, the aforesaid condition relating to $\theta$=0° defines a vertical strip parallax barrier, as shown in FIG. 30.

Figure 31:
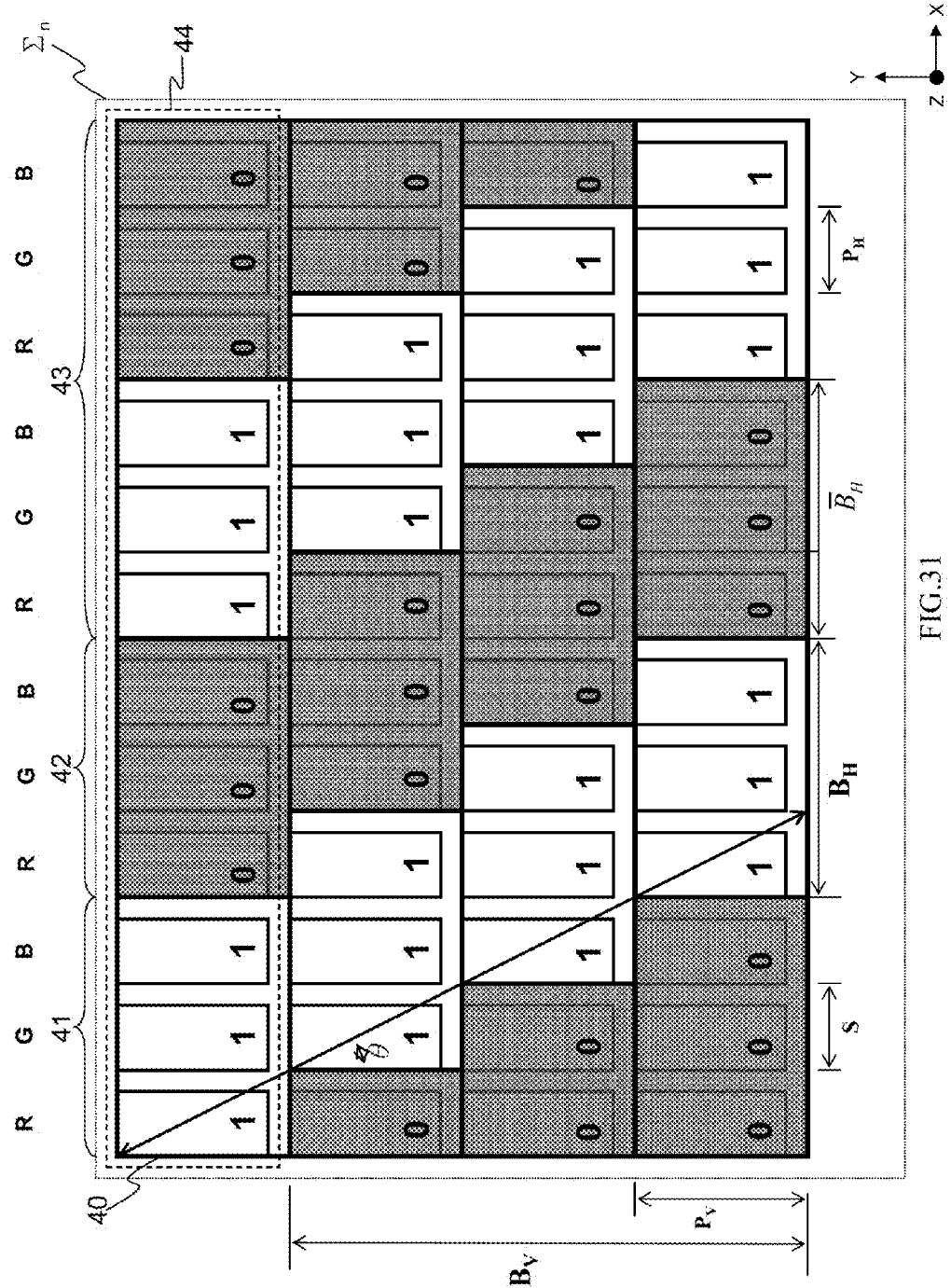
FIG. 31 is a schematic diagram showing the structure of a slant-and-step parallax barrier.

In addition, the design of a slant-and-step parallax barrier is basically the same as the design of a slantwise strip parallax barrier. As shown in FIG. 31, first a checkerboard-like transparent element 41 and a checkerboard-like shield element 42 are designed respectively according to the formulas (31) and (32), while allowing the checkerboard-like transparent element 41 and the checkerboard-like shield element 42 to construct a checkerboard unit 43 in combination. Accordingly, by aligning a plurality of such checkerboard units 43 one after another in the horizontal direction, a horizontal structure 44 is achieved; and thereafter, by aligning a plurality of such horizontal structures 44 in the vertical direction according to an increasing displacement S, that is defined by S=$P_H$ for instance as shown in FIG. 31, a slant-and-step parallax barrier 40 is achieved. Accordingly, for the slant-and-step parallax barrier 40, its horizontal structures 44 are designed to be displaced from one another by an increasing displacement S in the vertical direction. Nevertheless, such slant-and-step parallax barrier can also featured by an slant angle $\theta$, and the relationship between the slant angle $\theta$ and the displacement S is defined by the following formulas:

$$S = D_V \times \tan\theta = qD_H \quad (37)$$

Figure 16:
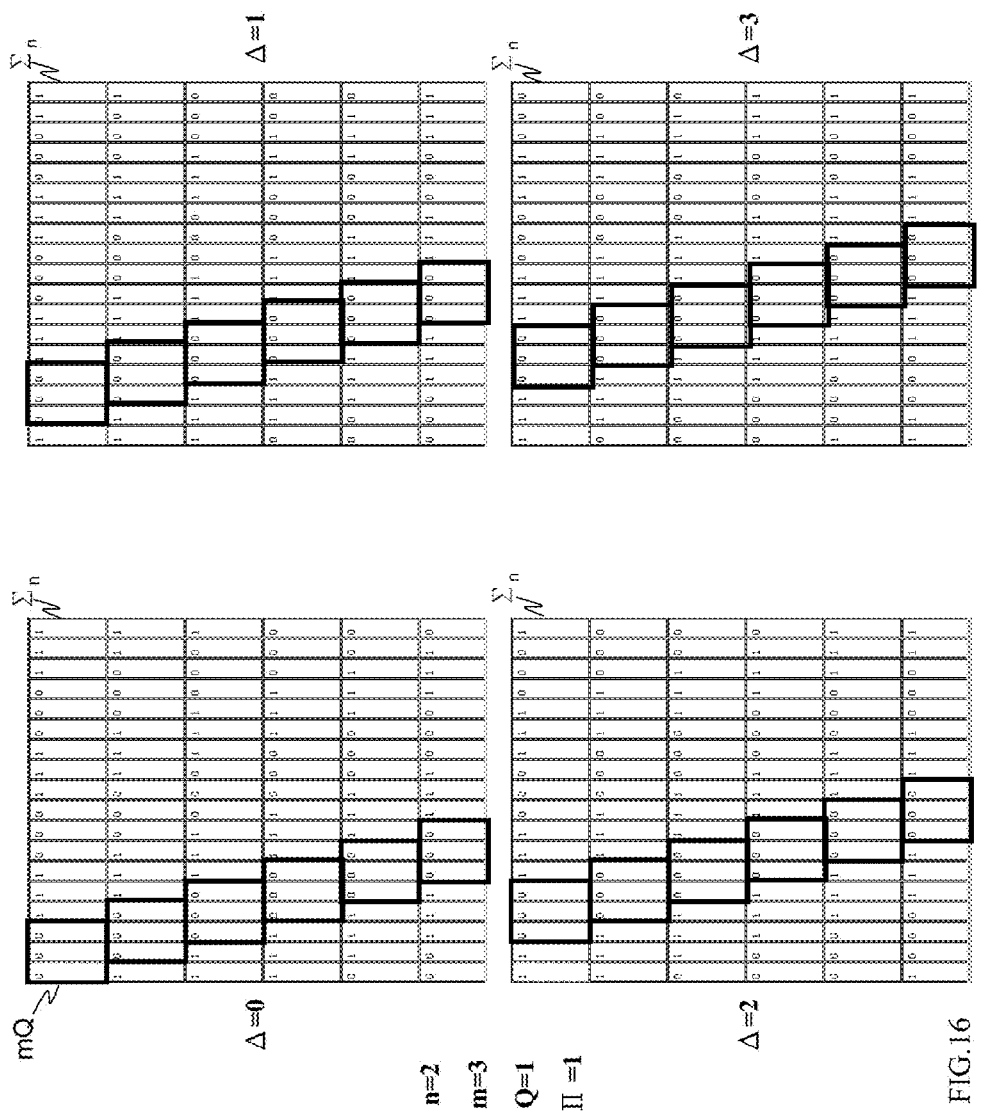
Figure 17:
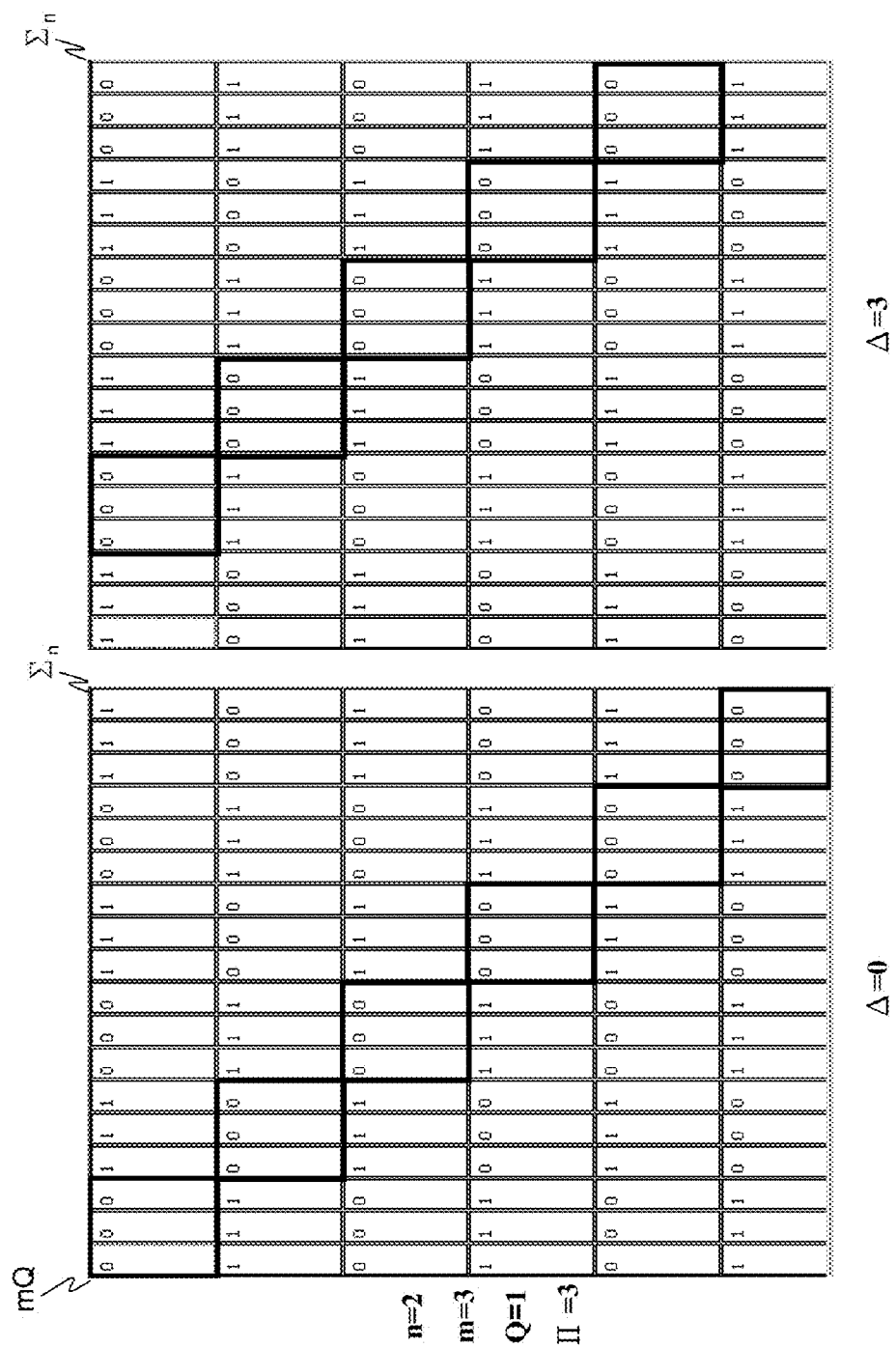
Figure 18:
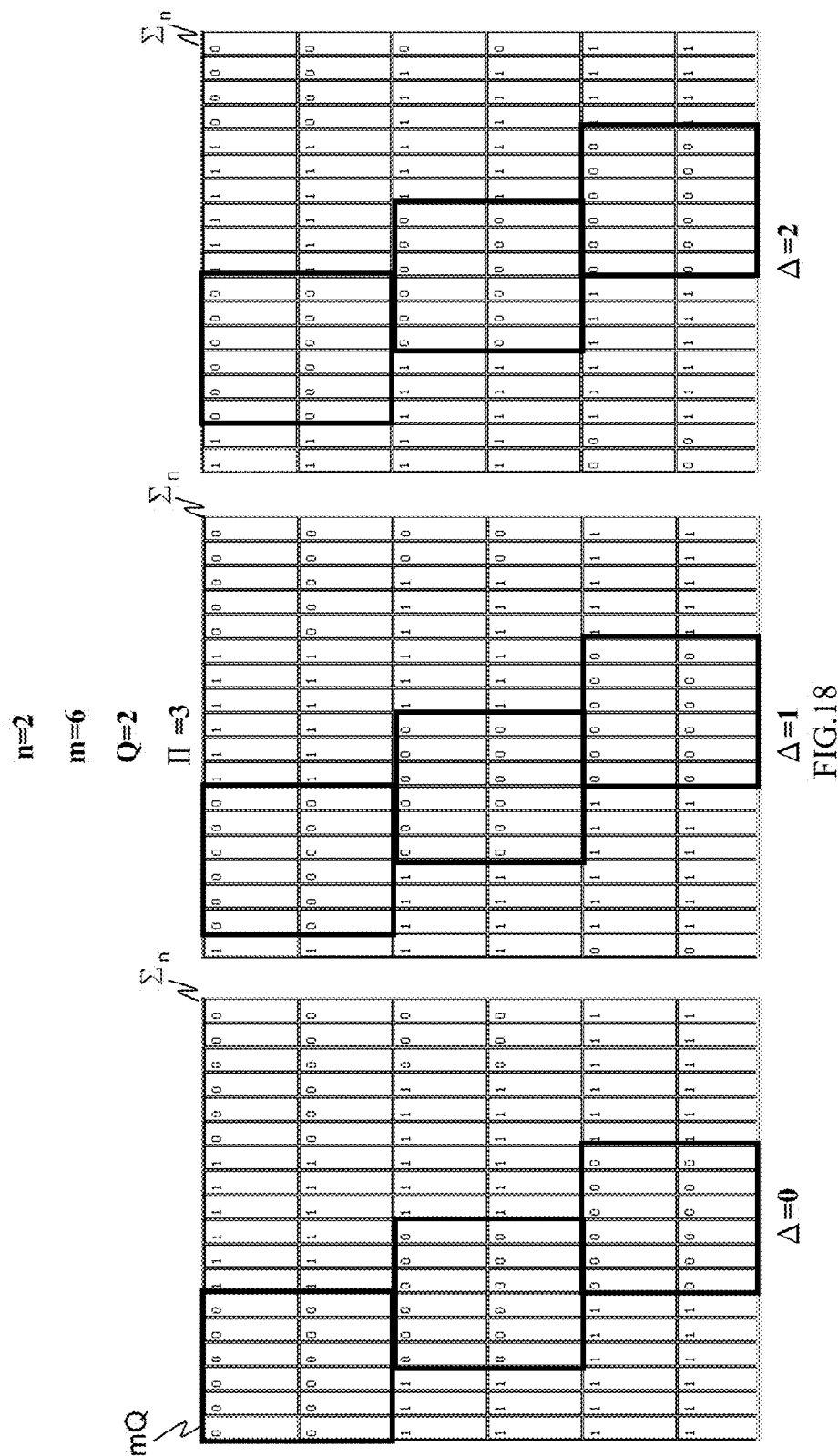
Figure 20:
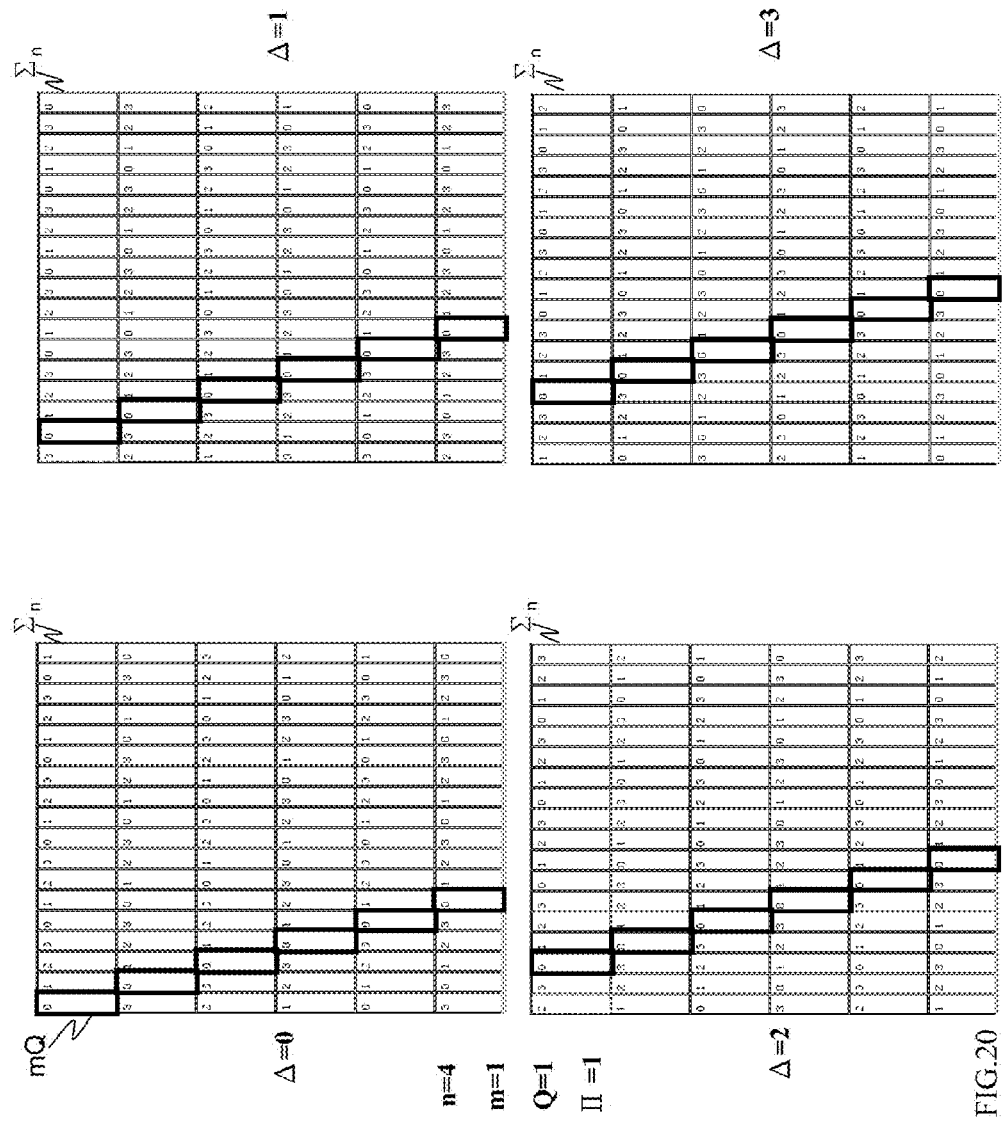

For instance, (a) for the size of a sub-pixel is defined by $P_V$=3$P_H$, and a display screen having R, G, and B sub-pixels in vertical strip configuration; when $D_H$=3$P_H$, $D_V$=$P_V$, q=⅓ and n=2, then S=$P_H$, which is applied to a 2-view 3D combined image displaying application as shown in FIG. 16; (b) for the size of a sub-pixel is defined by $P_V$=3$P_H$, and a display screen having R, G, and B sub-pixels in delta configuration; when $D_H$=3$P_H$, $D_V$=$P_V$, q=⅙ and n=2, then S=$P_H$/2, which is applied to a 2-view 3D combined image displaying application disclosed in TW Pat. Publication No.

Figure 11:
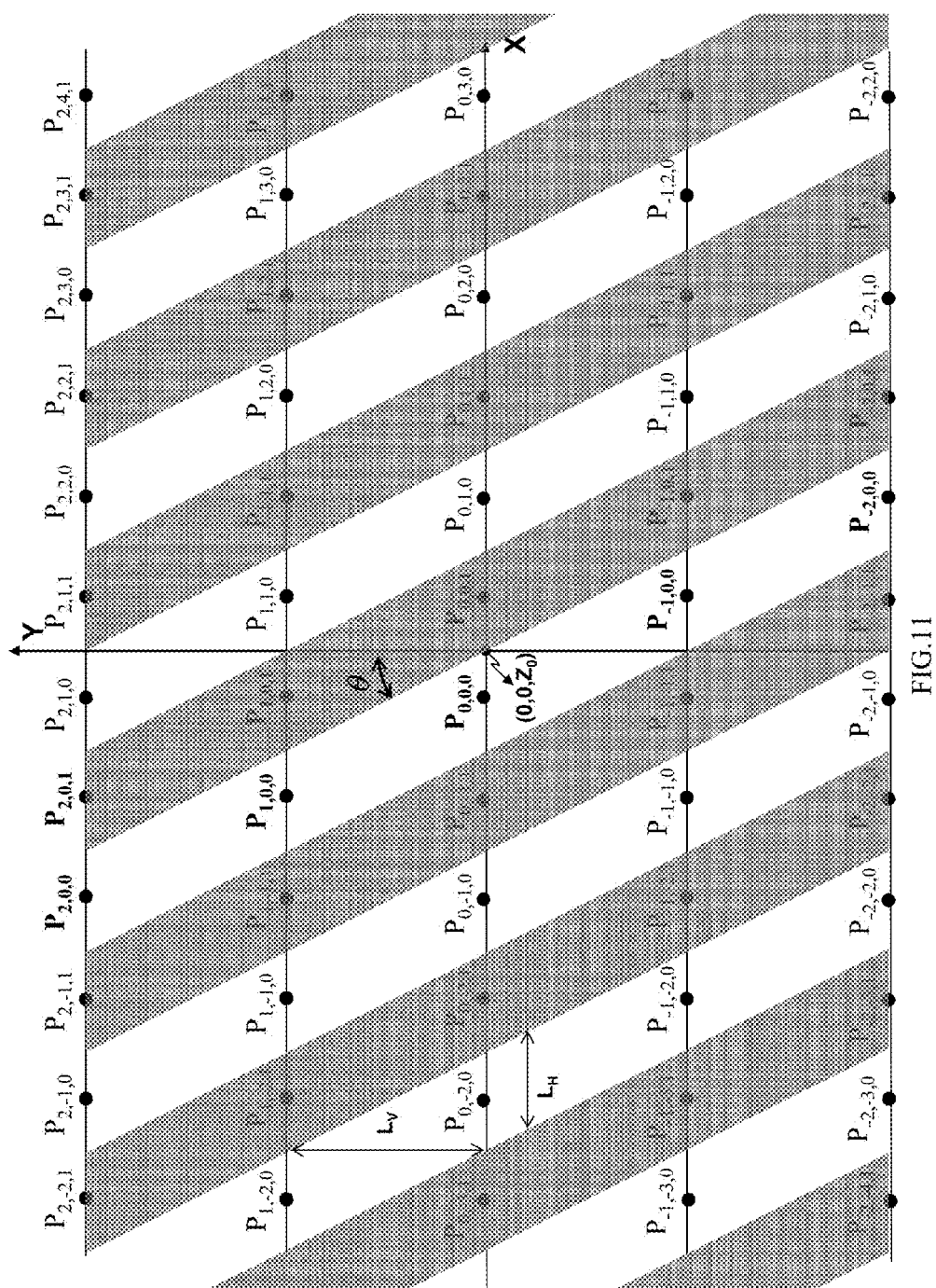
FIG. 11 is a schematic diagram showing an optimum left-viewing area.
Figure 12:
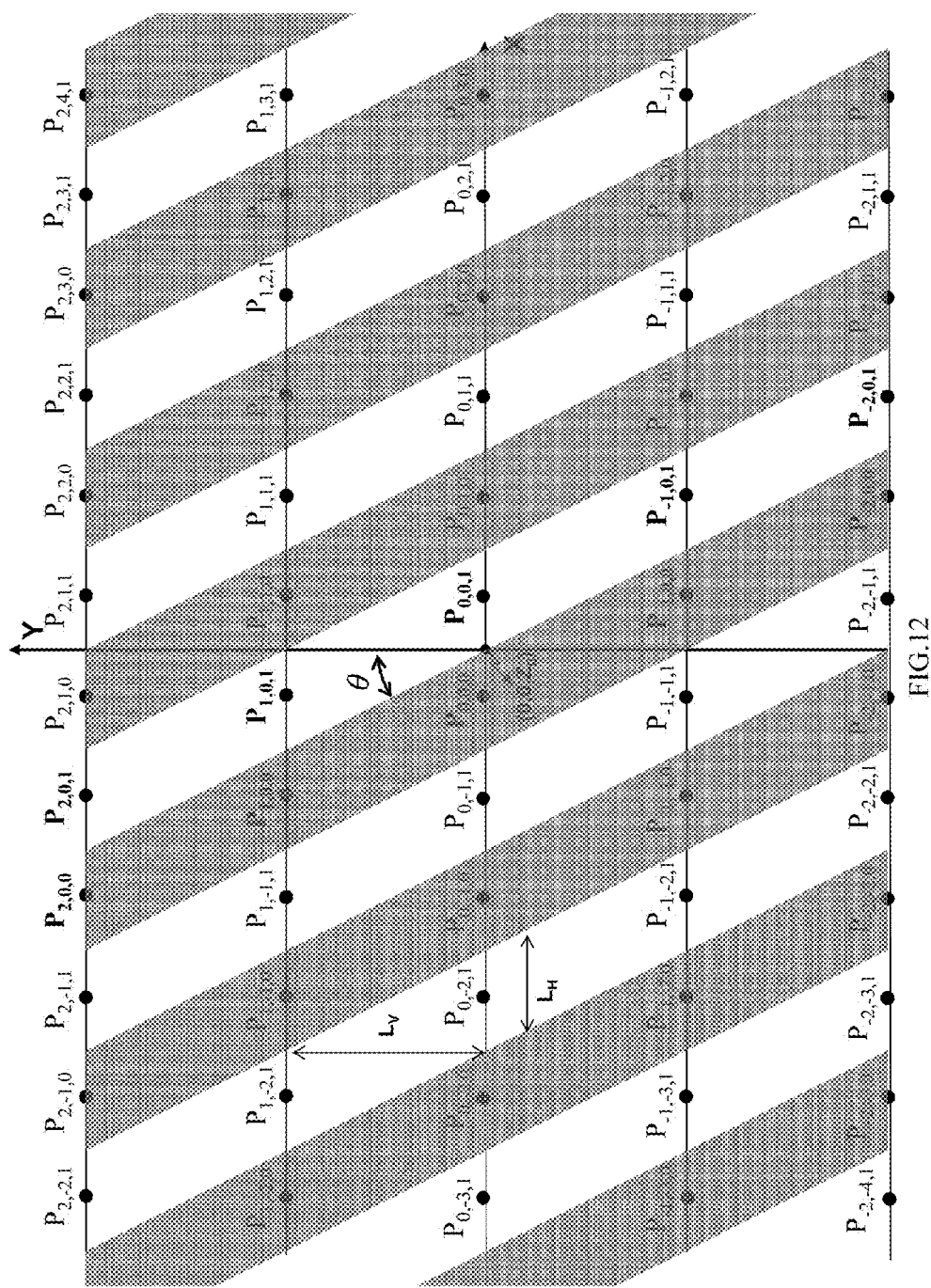
FIG. 12 is a schematic diagram showing an optimum right viewing area.

201216684 (FIG. 11 and FIG. 13); (c) for the size of a sub-pixel is defined by $P_V=3P_H$, and a display screen having R, G, and B sub-pixels in mosaic configuration; when $D_H=3P_H$, $D_V=P_V$, q=1 and n=2, then $S=3P_H$, and $\theta=45°$, which is applied to a 2-view 3D combined image displaying application disclosed in TW Pat. Publication. No. 201209448 (FIG. 11).

In response to the application of dual-directional 3D image displaying on hand-held devices, the aforesaid formulas (28)~(37) can also be applied in a condition that only one type of barrier is available and used for achieving dual-directional 3D image displaying. Thus, for the formulas (28)~(37), the parameters $D_H$, $D_V$, and q are defined as following:

$$D_H = D_V \qquad (38)$$

$$mP_H = QP_V \qquad (39)$$

$$q = 1 \qquad (40)$$

Thereby, the condition of $\theta=45°$ is achieved, while allowing the parameters $B_V$, $B_H$, $L_V$, and $L_H$ to be defined by the following formulas:

$$B_H = B_V \qquad (41)$$

$$L_H = L_V \qquad (42)$$

Figure 32:
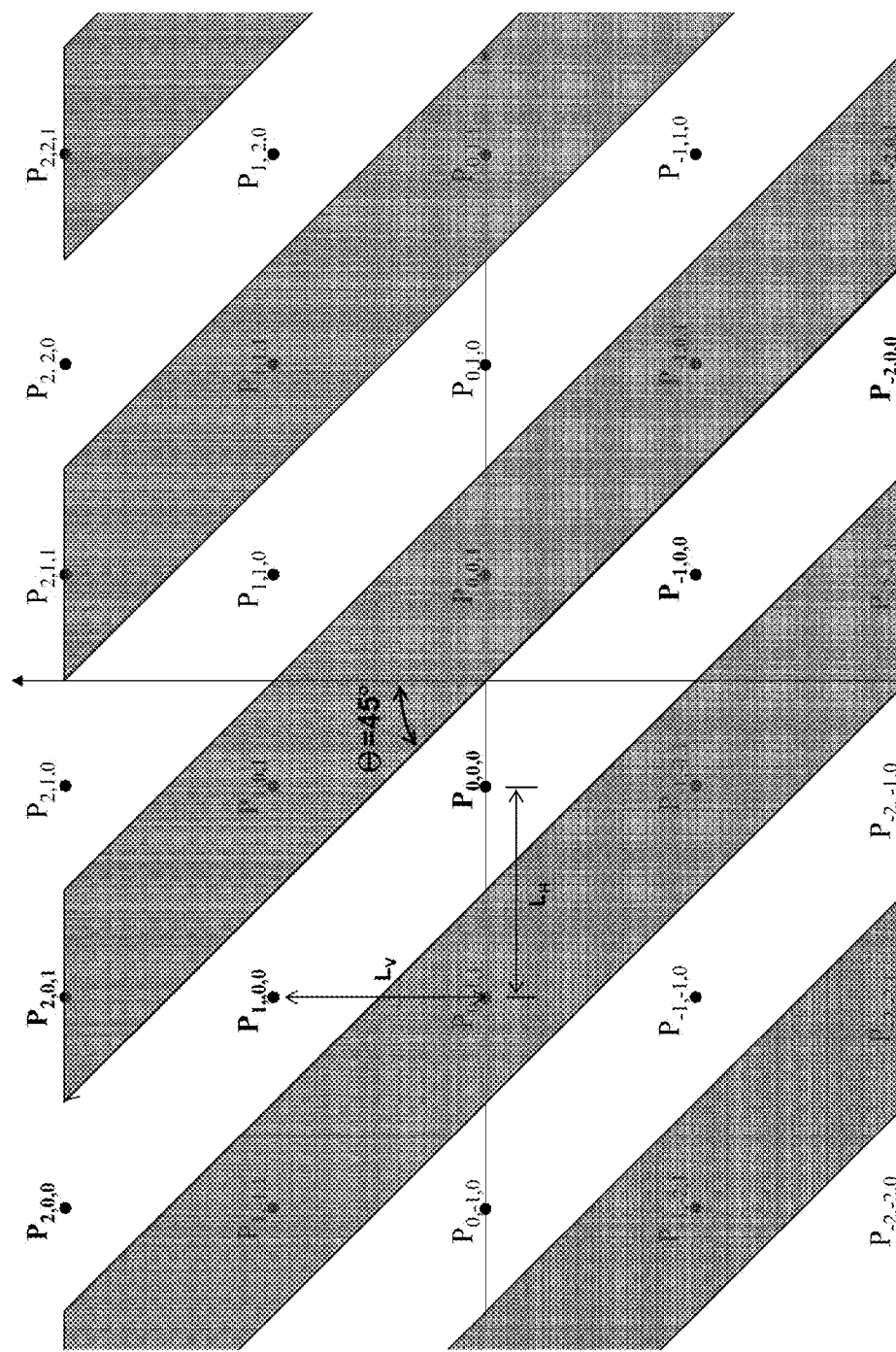
FIG. 32 and FIG. 33 are schematic diagrams showing the construction of a left-view area and a right-view area with dual-directional equivalent view separation effect.
Figure 33:
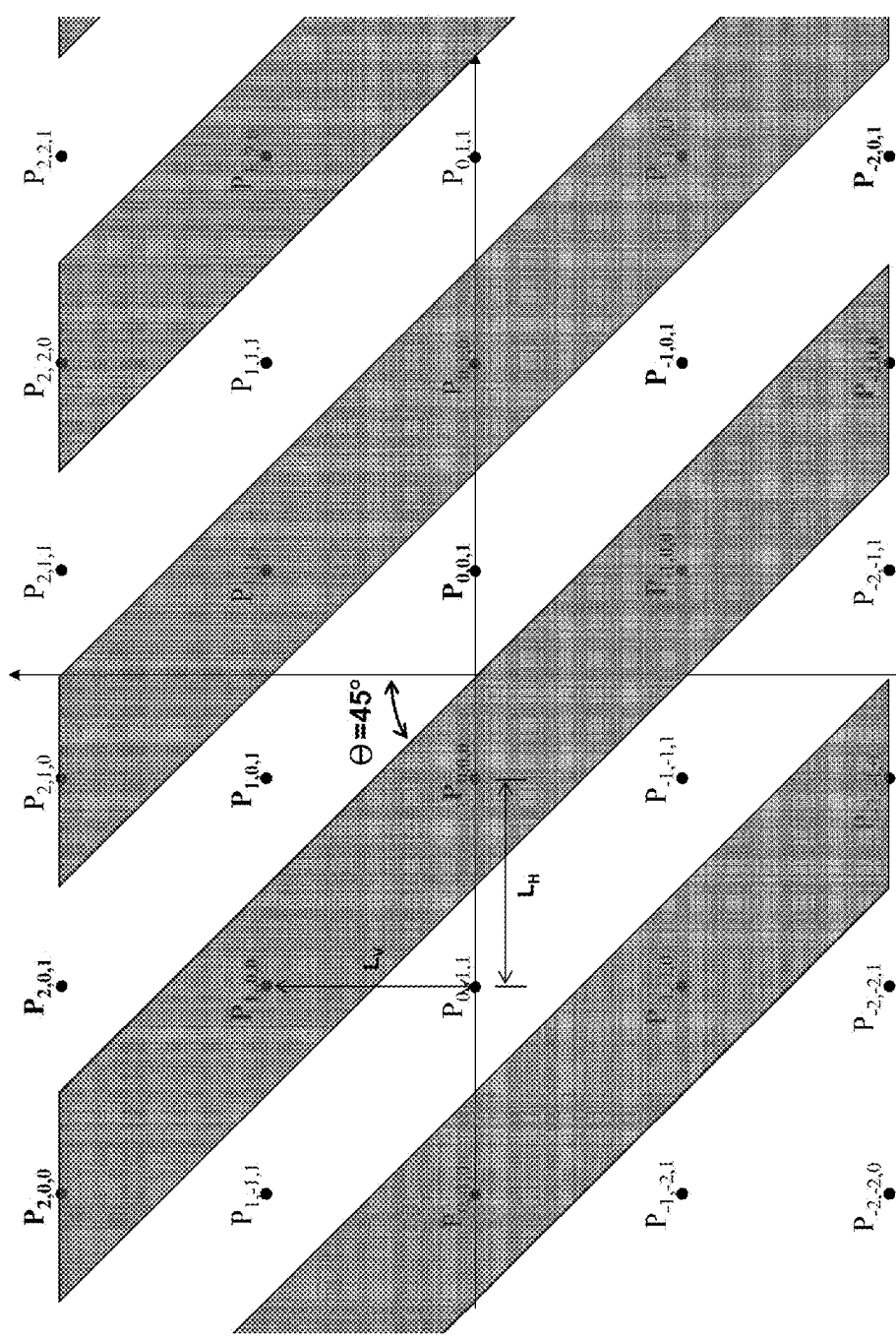

Please refer to FIG. 32 and FIG. 33, which are schematic diagrams showing the composition of a left-view area and a right-view area with dual-directional equivalent view separation effect. The left-view area and the right-view area are featured by a dual-directional equivalent view separation effect when the horizontal width, vertical width and slant angle of the left-view area and the right-view area are defined by the relationship of $L_H=L_V$ and $\theta=45°$. Thereby, no matter the display screen is operating in a landscape mode or a portrait mode, the left eye and right eye of a viewer that is positioned at a proper position can be located simultaneously inside the left-view area and the right-view area in respective so as to enable the viewer to see a 3D image. Taking the slant-and-step parallax barrier disclosed in the aforesaid example (c) for instance, it is achievable that only one type of barrier is used in a display screen with mosaic configuration for achieving dual-directional 3D image displaying.

In addition, although the parallax barrier defined by the formulas (28)~(42) of the present invention is a static structure, such formulas (28)~(42) can also apply for designing a dynamic parallax barrier, as the one disclosed in TW Pat. Publication No. 201122645, whereas the relative positioning of the transparent elements and the shield elements in a barrier is defined by a time function. By the use of a dynamic parallax barrier and the aforesaid dynamic 3D combined image, a 3D image displaying with full screen resolution can be achieved.

Figure 9:
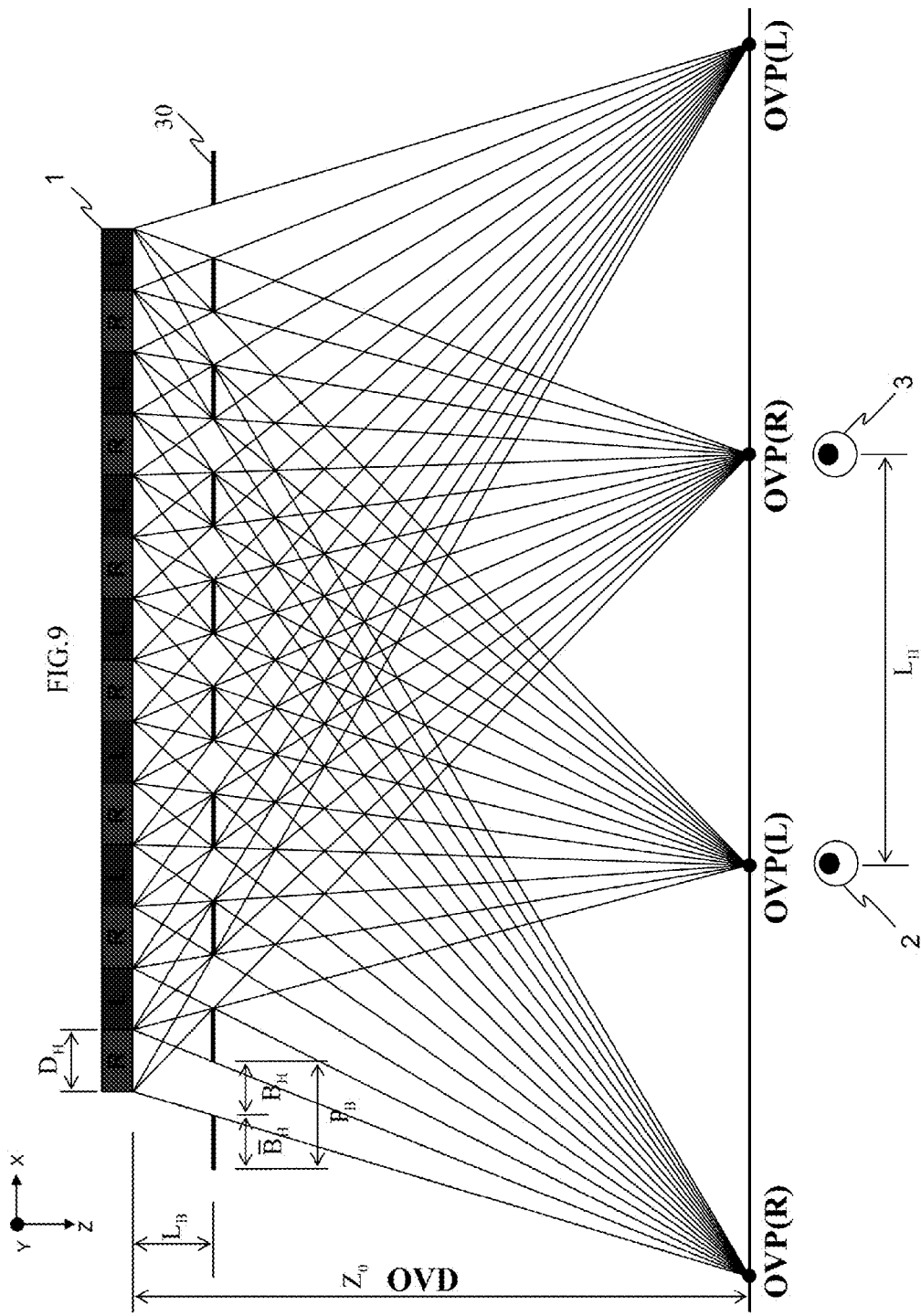
FIG. 9 is a schematic diagram showing a view separation principle for parallax barriers.
Figure 10:
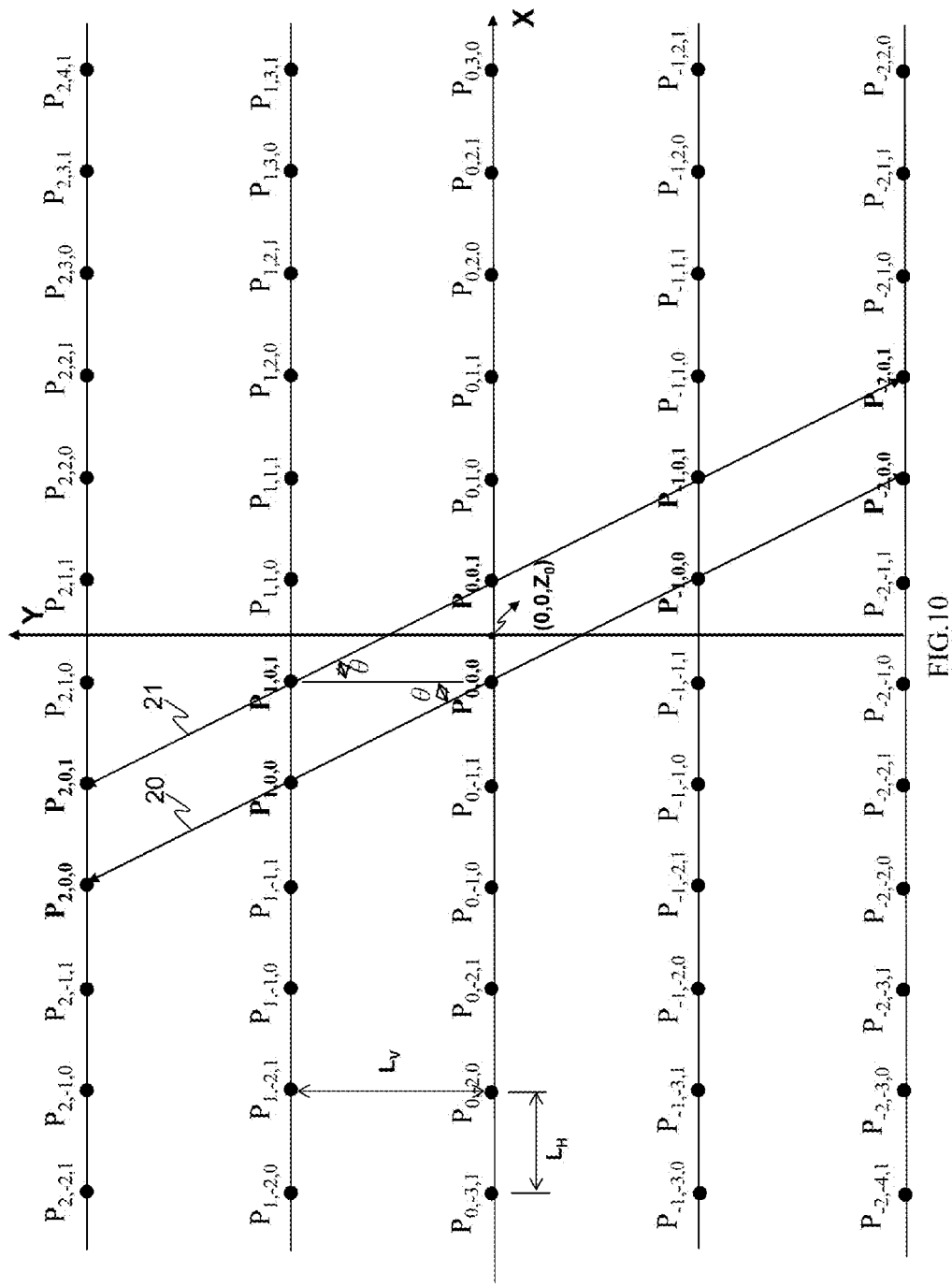
FIG. 10 is a schematic diagram showing an optimum viewing plane for a specific parallax barrier.
Figure 34:
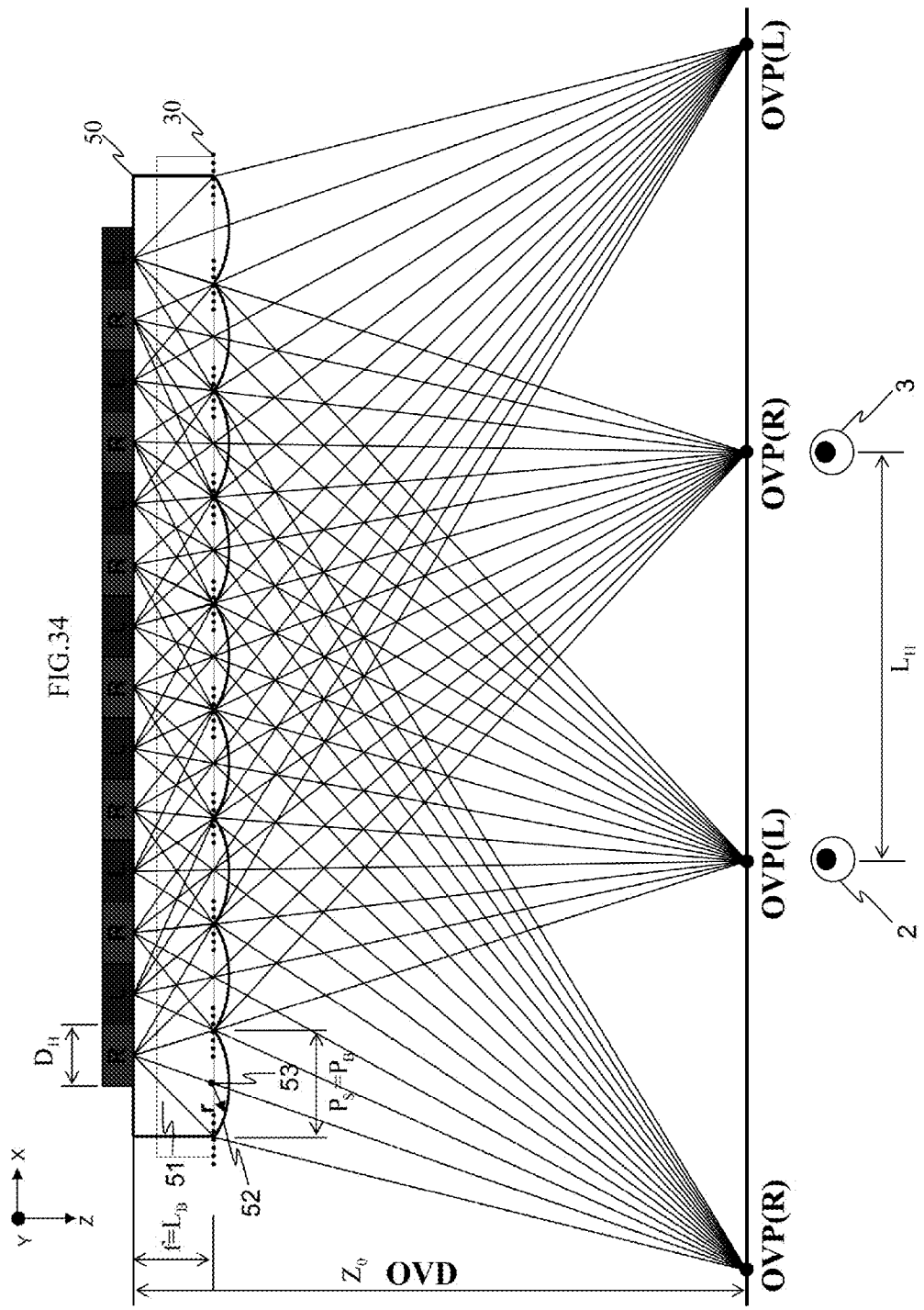
FIG. 34 is a schematic diagram showing the view separation effect resulting from a lenticular with equivalent optics behavior.

Although the formulas (28)~(42) of the present invention is used for designing a parallax barrier, it can be used for designing a lenticular with equivalent optics behavior. Please refer to FIG. 34, which is a schematic diagram showing the view separation effect resulting from a lenticular with equivalent optics behavior. As shown in FIG. 34, the lenticular 50 is composed of a plurality of cylindrical lenses 51, and each of the cylindrical lenses 51 is formed with a focal length f, a sectional width $P_S$, so that it can act and function the same as the parallax barrier shown in FIG. 9 with equivalent optics behavior. The parameters of each cylindrical lenses 51 are defined as following:

$$f = L_B \qquad (43)$$

$$P_S = P_B \qquad (44)$$

Figure 8:
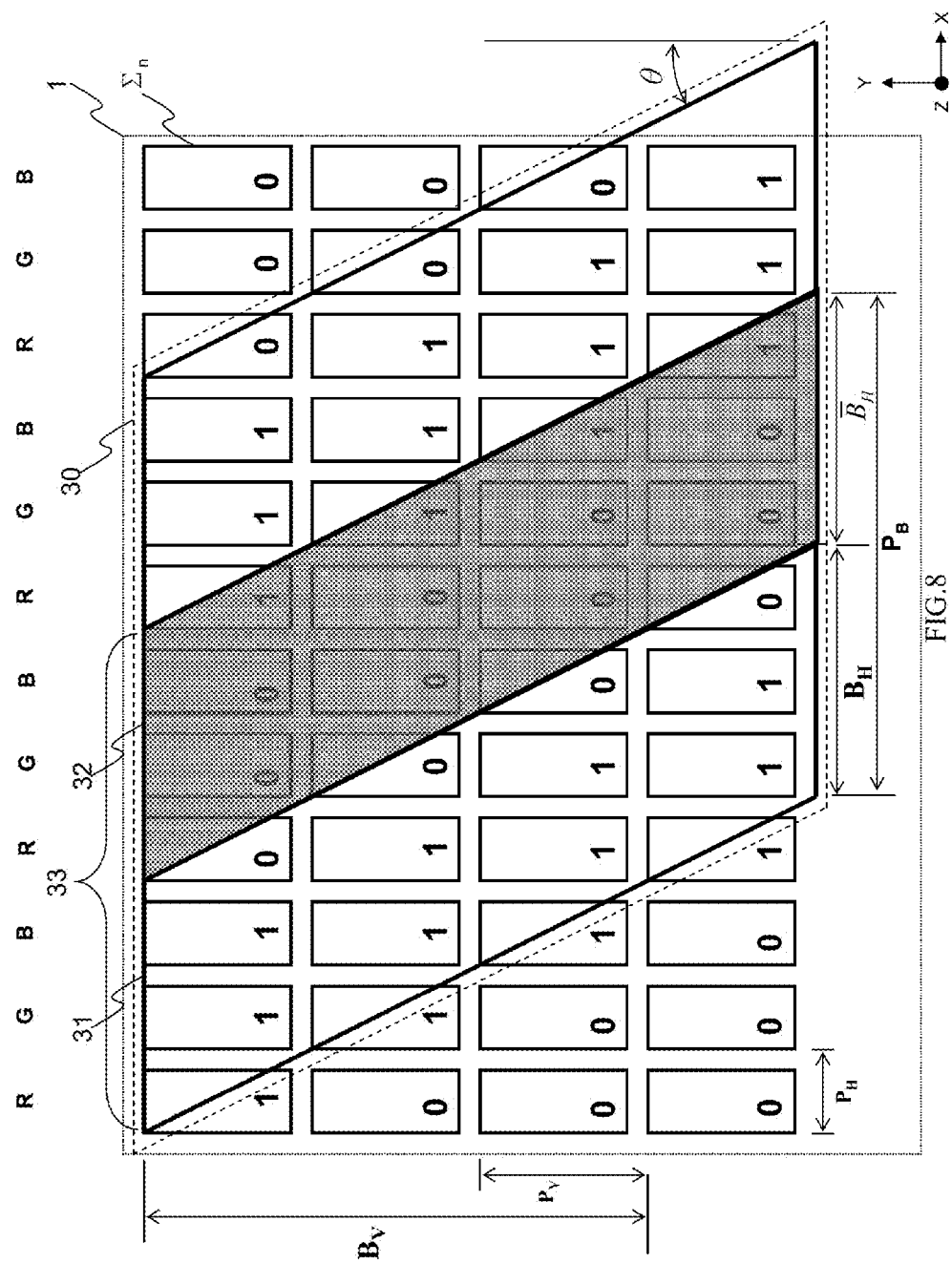
FIG. 8 is a schematic diagram showing a slantwise strip parallax barrier for 2-view images.

Wherein, r is a radius of a circular surface of one cylindrical lens 51, that are defined by a formula: f≅2r, while the focus length f is equal to the device distance $L_B$ of an equivalent parallax barrier 30. The lenticular 31 with equivalent optics behavior that are designed according to formulas (43) and (44) is able to achieved the same 2-view combined 3D image $\Sigma_n$ displaying similar to those shown in FIG. 8 and FIG. 9 at the same optimum viewing distance $Z_0$, optimum viewing points OVP(L) and OVP(R). In addition, for a lenticular with slantwise strip characteristic, the section of its cylindrical lens (the slanted sectional width of the cylindrical lens is $P_S \cos\theta$) is arranged for forming an included angle $\theta$ with respect to the horizontal direction (X axis). Accordingly, $P_s$ represents a horizontal sectional width, and thus $P_S \cos\theta$ represents the slanted sectional width of the cylindrical lens. Moreover, when $\theta=0°$, the slanted sectional width of the cylindrical lens $P_S \cos\theta$ is the sectional width of the cylindrical lens in horizontal direction. Consequently, the optimum viewing points OVP(L) and OVP(R) may no longer have to be distributed and extending horizontally, but can be distributed along the line 22 shown in FIG. 36 while defined by an optimum viewing interval $L_H$. However, since the left eye and right eye are arranged horizontally, an optimum viewing point of a right eye corresponding to the optimum OVP(L) of a left eye is the point OVP'(R), while the optimum viewing interval $L'_H$ is equal to IPD. Therefore, $$L_H = L'_H \cos\theta \qquad (45)$$

In addition, by substituting the formula (32) into the formula (44), i.e. $P_B = B_H + \overline{B}_H$, a formula can be obtained as following:

$$P_S = P_B = nB_H \qquad (46)$$

By substituting the formula (43) and $P_S \cos\theta$ into the formula (33), a formula can be obtained as following:

$$L_H = \frac{Z_0}{nf} P_S \cos\theta \qquad (47)$$

Then, by substituting the formula (47) into formula (45), the following formula is obtained:

$$L'_H = \frac{Z_0}{nf} P_S \qquad (48)$$

Thus, when the condition satisfying the formulas (43) and (44), the resulting lenticular has an equivalent optics behavior that is equivalent to a parallax barrier. For instance, let n=2, $P_S=2B_H$, and $f=L_B$, the optimum horizontal interval $L'_H$, as shown in formula (48), is equal to the optimum horizontal interval $L_H$ of a parallax barrier, as shown in formula (33). That is, by substituting the formulas (43) and (44) into the design formula of a parallax barrier, i.e. the formulas (28)~(36), formulas for designing a lenticular with equivalent optics behavior can be obtained, as following:

$$\tan\theta = q\frac{D_H}{D_V} \qquad (49)$$

-continued $$D_H = mP_H \qquad (50)$$

$$D_V = QP_V \qquad (51)$$

$$P_S = n\frac{D_H L_H}{D_H + L_H} = \frac{Z_0 - f}{Z_0} n D_H \qquad (52)$$

$$L_H = \frac{Z_0}{nf} P_S \qquad (53)$$

$$Z_0 = \frac{D_H}{D_H - \frac{P_S}{n}} f \qquad (54)$$

$$L_V = \frac{L_H}{\tan\theta} \qquad (55)$$

To sum up, the present invention provides a method for displaying a three-dimensional (3D) image, which is further composed of a multi-view 3D image combination method and a view separation device structure design method, and is being used in a case when a common flat-panel display screen and a view separation device are used to display a 3D image. It is further to be obviously realized that the view separation device method disclosed by the present invention is also adapted to the structure design of liquid crystal parallax barrier and liquid crystal lenticular.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A method for displaying a multi-view three-dimensional (3D) image, adapted to be applied to a flat-panel display screen and a view separation device composed of parallax barriers for 3D image displaying, comprising:

performing a multi-view combination process upon a plurality of single-view images $V_A$ so as to form and display a multi-view combined 3D image $\Sigma_n$ on the flat-panel display screen; and generating a parallax barrier that is composed of a plurality of transparent elements and a plurality of shield elements, and is used for enabling a view separation effect upon the multi-view combined 3D image $\Sigma_n$ for enabling 3D effect;

wherein, the multi-view 3D image combination process is established using the following formulas:

$$\Sigma_n = \sum_{i=0}^{M-1}\sum_{j=0}^{N-1} V_A(i,j) \qquad (1)$$

and $$A = \text{Mod}\left[\text{int}\left(\frac{j - \Pi \times \text{int}\left(\frac{i}{Q}\right) - \Delta}{m}\right), n\right] \qquad (2)$$

$$A = \text{Mod}\left[\text{int}\left(\frac{(N-1) - j - \Pi \times \text{int}\left(\frac{i}{Q}\right) - \Delta}{m}\right), n\right] \qquad (3)$$

and the parallax barrier is established using the following formulas:

$$\tan\theta = q\frac{D_H}{D_V} \qquad (4)$$

$$D_H = mP_H \qquad (5)$$

$$D_V = QP_V \qquad (6)$$

$$B_H = \frac{D_H L_H}{D_H + L_H} = \frac{Z_0 - L_B}{Z_0} D_H \qquad (7)$$

$$\overline{B}_H = (n-1)B_H \qquad (8)$$

$$L_H = \frac{D_H B_H}{D_H - B_H} = \frac{Z_0}{L_B} B_H \qquad (9)$$

$$Z_0 = \frac{D_H}{D_H - B_H} L_B \qquad (10)$$

$$B_V = \frac{B_H}{\tan\theta} \qquad (11)$$

$$L_V = \frac{L_H}{\tan\theta} \qquad (12)$$

$$S = D_V \times \tan\theta = qD_H \qquad (13)$$

and, the flat-panel display screen is composed of N×M sub-pixels, in which N represents the total number of sub-pixels in a horizontal direction (X axis) of the display screen, and M represents the total number of sub-pixels in a vertical direction (Y axis) of the display screen; in addition, the horizontal position and the vertical position of any single sub-pixel in N×M display screen are represented respectively using the index i and j, whereas $0 \leq j \leq N-1$ and $0 \leq i \leq M-1$ and each single sub-pixel has a size of $P_H \times P_V$, whereas $P_H$ represents the horizontal width of a single sub-pixel and $P_V$ represents the vertical height of a single sub-pixel; and moreover, $V_A(i, j)$ represents the sub-pixel image data of a single-view image $V_A$ at position (i, j) of the display screen; A represents a view number, and $0 \leq A < n$, while n is the total amount of view; m is a positive integer representing a number of sub-pixels of a smallest display unit in horizontal direction, while Q is a positive integer representing a number of sub-pixels of a smallest display unit in vertical direction; $\Delta$ is an integer representing a horizontal displacement phase; $\Pi$ is an integer representing a horizontal displacement amplitude; and int is a round down integer function, and Mod is a function of taking a remainder; and $B_H$ represents a horizontal width for each transparent element, and $\overline{B}_H$ represents a horizontal width for each shield element; $\theta$ is a slant angle for the strip parallax barrier; $Z_0$ is an optimum viewing distance; $L_B$ is a distance to the parallax barrier; $L_H$ is the optimum horizontal interval between two neighboring optimum viewing points; $L_V$ is the optimum vertical interval between two neighboring optimum viewing points; $D_H$ is the width of a smallest display unit in horizontal direction; $D_V$ is the width of a smallest display unit in vertical direction; q is a real number representing a rate of inclination; and S is an increasing displacement of the parallax barrier;

wherein, the flat-panel display screen and parallax barrier are determined to increase an optimal dimensional relationship for displaying a multi-view combined 3D image.

2. The method for displaying a multi-view 3D image of claim 1, wherein there is further a calculation performed based upon the view number $\Lambda$ of the formula (2) and formula (3), as following:

$$\Lambda' = \text{Mod}\left[\left(a\Lambda + b\text{Mod}\left(\text{int}\left(\frac{i}{Q}\right), c\right)\right), d\right] \quad (14)$$

and, a, b, c, d is a set of control constants that can be defined as a=1, b=0, c=arbitrary number, d≥n, or a=2, b=1, c=n, d=n, whereas n is the total amount of view, int is a round down integer function and Mod is a function of taking a remainder.

3. The method for displaying a multi-view 3D image of claim 1, wherein the sub-pixels in the flat-panel display screen is arranged in a configuration selected from the group consisting of: a vertical strip configuration, a mosaic configuration, a delta configuration and a pentile configuration.

4. A method for displaying a multi-view three-dimensional (3D) image, adapted to be applied to a flat-panel display screen and a view separation device composed of lenticular for 3D image displaying, the method further comprises:

performing a multi-view combination process upon a plurality of single-view images $V_\Lambda$ so as to form and display a multi-view combined 3D image $\Sigma_n$ on the flat-panel display screen; and generating a lenticular structure that is composed of a plurality of cylindrical lenses, and is used for enabling a view separation effect upon the multi-view combined 3D image $\Sigma_n$ for enabling 3D effect, and each cylindrical lens being formed with a focal length f, a horizontal sectional width $P_S$, a circular surface of a radius r, that are defined by a formula: f≅2r;

wherein, the multi-view 3D image combination process is established using the following formulas:

$$\Sigma_n = \sum_{i=0}^{M-1} \sum_{j=0}^{N-1} V_\Lambda(i, j) \quad (15)$$

and (16)

$$\Lambda = \text{Mod}\left[\text{int}\left(\frac{j - \Pi \times \text{int}\left(\frac{i}{Q}\right) - \Delta}{m}\right), n\right] \quad$$

$$\Lambda = \text{Mod}\left[\text{int}\left(\frac{(N-1) - j - \Pi \times \text{int}\left(\frac{i}{Q}\right) - \Delta}{m}\right), n\right] \quad (17)$$

and the lenticular structure is generated using the following formulas:

$$\tan\theta = q\frac{D_H}{D_V} \quad (18)$$

$$D_H = mP_H \quad (19)$$

$$D_V = QP_V \quad (20)$$

$$P_S = \frac{Z_0 - f}{Z_0}nD_H \quad (21)$$

$$L_H = \frac{Z_0}{nf}P_S \quad (22)$$

$$Z_0 = \frac{D_H}{D_H - \frac{P_S}{n}}f \quad (23)$$

$$L_V = \frac{L_H}{\tan\theta} \quad (24)$$

and, the flat-panel display screen is composed of N×M sub-pixels, in which N represents the total number of sub-pixels in a horizontal direction (X axis) of the display screen, and M represents the total number of sub-pixels in a vertical direction (Y axis) of the display screen; in addition, the horizontal position and the vertical position of any single sub-pixel in N×M display screen are represented respectively using the index i and j, whereas 0≤j≤N-1 and 0≤i≤M-1; and each single sub-pixel has a size of $P_H \times P_V$, whereas $P_H$ represents the horizontal width of a single sub-pixel and $P_V$ represents the vertical height of a single sub-pixel; and moreover, $V_\Lambda(i, j)$ represents the sub-pixel image data of a single-view image $V_\Lambda$ at position (i, j) of the display screen; Λ represents a view number, and 0≤Λ<n, while n is the total amount of view; m is a positive integer representing a number of sub-pixels of a smallest display unit in horizontal direction, while Q is a positive integer representing a number of sub-pixels of a smallest display unit in vertical direction; Δ is an integer representing a horizontal displacement phase; Π is an integer representing a horizontal displacement amplitude; and int is a round down integer function, and Mod is a function of taking a remainder; and $B_H$ represents a horizontal width for each transparent element, and $B_H$ represents a horizontal width for each shield element; θ is a slant angle for the lenticular structure; $Z_0$ is an optimum viewing distance; $L_H$ is the optimum horizontal interval between two neighboring optimum viewing points; $L_V$ is the optimum vertical interval between two neighboring optimum viewing points; $D_H$ is the width of a smallest display unit in horizontal direction; $D_V$ is the width of a smallest display unit in vertical direction; q is a real number representing a rate of inclination; and moreover, when θ≠0°, the slanted sectional width of the cylindrical lens is $P_S \cos\theta$;

wherein, the flat-panel display screen and parallax barrier are determined to increase an optimal dimensional relationship for displaying a multi-view combined 3D image.

5. The method for displaying a multi-view 4D image of claim 4, wherein there is further a calculation performed based upon the view number Λ of the formula (2) and formula (3), as following:

$$\Lambda' = \text{Mod}\left[\left(a\Lambda + b\text{Mod}\left(\text{int}\left(\frac{i}{Q}\right), c\right)\right), d\right] \quad (25)$$

and, a, b, c, d is a set of control constants that can be defined as a=1, b=0, c=arbitrary number, d≥n, or a=2, b=1, c=n, d=n, whereas n is the total amount of view, int is a round down integer function and Mod is a function of taking a remainder.

6. The method for displaying a multi-view 4D image of claim 5, wherein the sub-pixels in the flat-panel display screen is arranged in a configuration selected from the group consisting of: a vertical strip configuration, a mosaic configuration, a delta configuration and a pentile configuration.

* * * * *